(12) United States Patent
Yoshida et al.

(10) Patent No.: US 10,787,955 B2
(45) Date of Patent: Sep. 29, 2020

(54) TWO-STAGE TURBO SYSTEM AND CONTROL METHOD FOR TWO-STAGE TURBO SYSTEM

(71) Applicant: MITSUBISHI HEAVY INDUSTRIES, LTD., Tokyo (JP)

(72) Inventors: Toyotaka Yoshida, Tokyo (JP); Kunihiro Tomikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 66 days.

(21) Appl. No.: 16/080,245

(22) PCT Filed: Mar. 3, 2017

(86) PCT No.: PCT/JP2017/008570
§ 371 (c)(1),
(2) Date: Aug. 27, 2018

(87) PCT Pub. No.: WO2017/169515
PCT Pub. Date: Oct. 5, 2017

(65) Prior Publication Data
US 2019/0048789 A1    Feb. 14, 2019

(30) Foreign Application Priority Data

Mar. 30, 2016    (JP) .................... 2016-068503

(51) Int. Cl.
*F02B 37/02*    (2006.01)
*F02B 37/013*    (2006.01)
(Continued)

(52) U.S. Cl.
CPC ............ *F02B 37/025* (2013.01); *F02B 37/00* (2013.01); *F02B 37/004* (2013.01);
(Continued)

(58) Field of Classification Search
CPC ...... F02B 37/004; F02B 37/025; F02B 37/18; F02B 37/016; F02B 37/183
(Continued)

(56) References Cited

U.S. PATENT DOCUMENTS

| | | |
|---|---|---|
| 4,729,715 A | 3/1988 | Wilde |
| 5,092,126 A | 3/1992 | Yano |

(Continued)

FOREIGN PATENT DOCUMENTS

| | | |
|---|---|---|
| CN | 101091041 A | 12/2007 |
| CN | 102235187 A | 11/2011 |

(Continued)

OTHER PUBLICATIONS

International Search Report for PCT/JP2017/008570 dated Jun. 6, 2017.

(Continued)

*Primary Examiner* — Mark A Laurenzi
*Assistant Examiner* — Mickey H France
(74) *Attorney, Agent, or Firm* — Birch, Stewart, Kolasch & Birch, LLP

(57) ABSTRACT

A two-stage turbo system includes: a high-pressure stage turbocharger having a high-pressure stage turbine disposed in an exhaust passage of an engine; and a low-pressure stage turbocharger which includes a low-pressure stage turbine disposed downstream of the high-pressure stage turbine in the exhaust passage, and which is larger in size than the high-pressure stage turbocharger. The low-pressure stage turbine includes at least two scroll passages including a first scroll passage and a second scroll passage, which together form a scroll part for introducing exhaust gas into a nozzle flow passage of the low-pressure stage turbine. The scroll part is configured such that a first range of the nozzle flow passage into which the exhaust gas passing through the first (Continued)

scroll passage is introduced does not overlap with a second range of the nozzle flow passage into which the exhaust gas passing through the second scroll passage is introduced, in a circumferential direction of the nozzle flow passage.

10 Claims, 10 Drawing Sheets

(51) Int. Cl.
  *F02B 37/18* (2006.01)
  *F02B 37/00* (2006.01)
(52) U.S. Cl.
  CPC ............ *F02B 37/013* (2013.01); *F02B 37/18* (2013.01); *F02B 37/183* (2013.01); *F05D 2220/40* (2013.01); *F05D 2240/128* (2013.01); *Y02T 10/144* (2013.01)
(58) Field of Classification Search
  USPC ................ 60/600, 598, 602, 605.1, 612
  See application file for complete search history.

(56) References Cited

U.S. PATENT DOCUMENTS

| | | | |
|---|---|---|---|
| 7,426,831 B2 | 9/2008 | Grissom | |
| 7,644,585 B2 | 1/2010 | Haugen | |
| 8,671,682 B2 | 3/2014 | Parlow et al. | |
| 10,054,037 B2* | 8/2018 | Robinson | F02B 37/183 |
| 2005/0056015 A1 | 3/2005 | Fledersbacher et al. | |
| 2006/0042247 A1* | 3/2006 | Haugen | F01D 9/026 |
| | | | 60/612 |
| 2007/0079612 A1 | 4/2007 | Grissom | |
| 2011/0000208 A1* | 1/2011 | Robinson | F02B 37/001 |
| | | | 60/602 |
| 2011/0274539 A1 | 11/2011 | Koenigsegg | |
| 2011/0296828 A1 | 12/2011 | An et al. | |
| 2012/0152214 A1 | 6/2012 | Thorne et al. | |
| 2014/0360179 A1 | 12/2014 | Doering et al. | |
| 2015/0075159 A1 | 3/2015 | Kemmerling et al. | |

FOREIGN PATENT DOCUMENTS

| | | |
|---|---|---|
| CN | 104234819 A | 12/2014 |
| CN | 104454139 A | 3/2015 |
| DE | 4242494 C1 | 9/1993 |
| DE | 3907504 C2 | 12/1995 |
| DE | 102 22 919 A1 | 12/2003 |
| DE | 10 2005 039 756 A1 | 3/2007 |
| DE | 10 2007 034 235 A1 | 1/2009 |
| GB | 2 178 111 A | 2/1987 |
| JP | 2005-133665 A | 5/2005 |
| JP | 2005-527728 A | 9/2005 |
| JP | 2008-514842 A | 5/2008 |
| JP | 2010-190070 A | 9/2010 |
| WO | WO 2009/030914 A2 | 3/2009 |
| WO | WO 2010/097979 A1 | 9/2010 |
| WO | WO 2014/140598 A1 | 9/2014 |

OTHER PUBLICATIONS

Extended European Search Report dated Sep. 9, 2019, for European Application No. 17774060.2.

Japanese Office Action dated Sep. 24, 2019, for Japanese Patent Application No. 2016-068503, with English translation.

Japanese Office Action, dated Feb. 4, 2020, for Japanese Application No. 2016-068503, with an English translation.

Chinese Office Action and Search Report, dated Feb. 3, 2020, for Chinese Application No. 201780013603.7, with an English translation.

Office Action dated May 28, 2020 issued in counterpart European Patent Application No. 17774060.2.

* cited by examiner

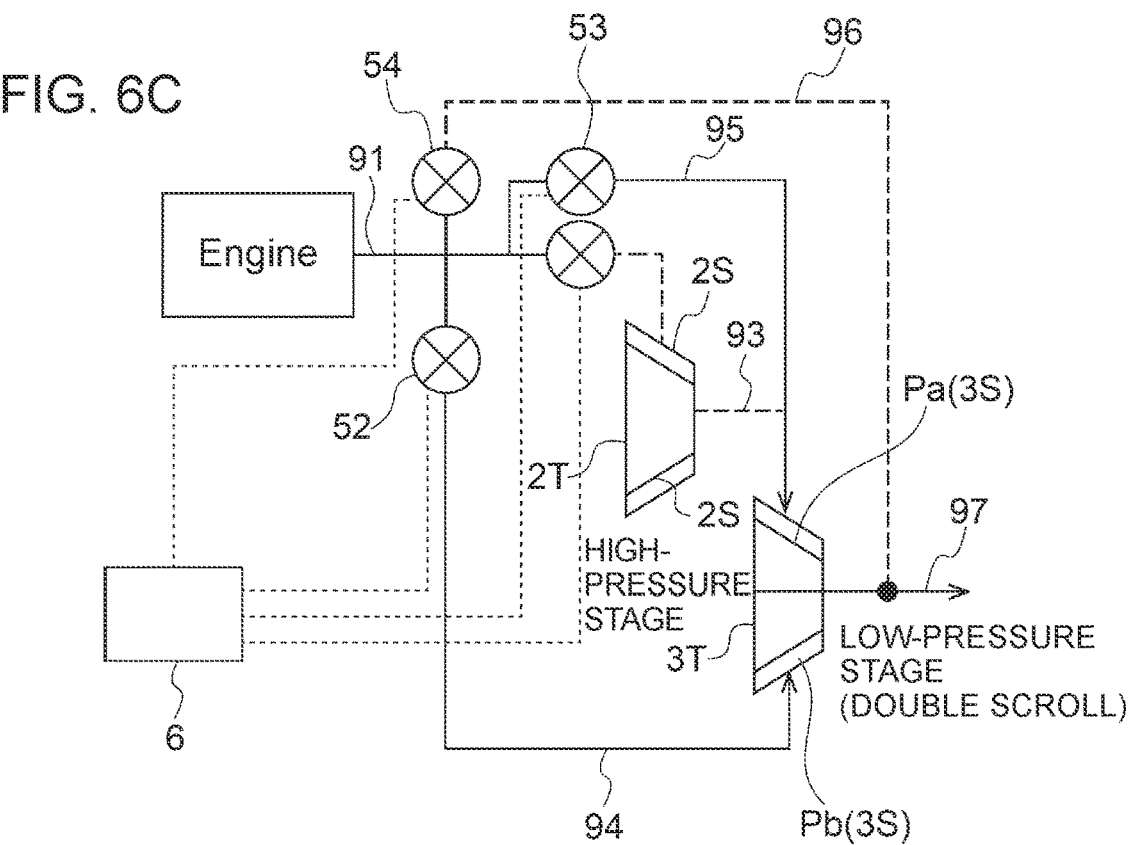
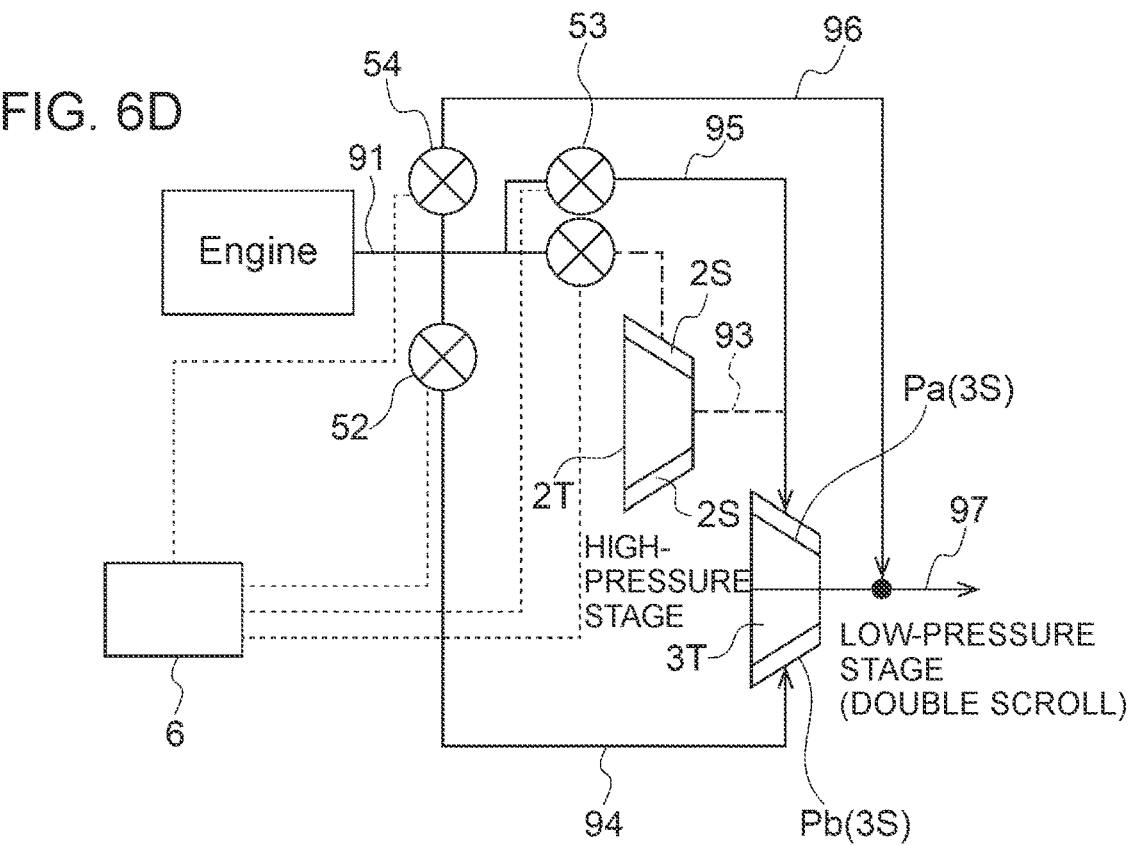

TWO-STAGE TURBO SYSTEM AND CONTROL METHOD FOR TWO-STAGE TURBO SYSTEM

TECHNICAL FIELD

The present disclosure relates to a two-stage turbo system, which is a supercharging system for an engine.

BACKGROUND ART

A two-stage turbo system is known as a supercharging system that can be applied to an engine such as a diesel engine. A two-stage turbo system is regarded as a promising supercharging system which can be applied to an existing diesel engine without adding extensive modification, which can achieve both torque up and high output at a low speed, and which has an improved response (transient response performance). More specifically, a two-stage turbo system includes a high-pressure stage turbocharger and a low-pressure stage connected in series, whereby it is possible to switch stages of supercharging through switching of the flow passage of the exhaust passage by controlling the opening degree of various valves disposed in the exhaust passage. Further, by switching supercharging between the single stage supercharging and the two-stage supercharging in accordance with the operational conditions of the engine, it is possible to improve the response at a low speed while generating a necessary boost pressure over a broad operational range of the engine. Generally, exhaust gas has a small flow rate when the engine is at a low speed, and the flow passage of the exhaust gas is switched so that two-stage supercharging is performed by allowing the exhaust gas to flow through the high-pressure stage turbocharger and the low-pressure stage turbocharger in this order. Furthermore, while the two-stage supercharging is also performed when the engine is at a middle speed, the exhaust passage is switched so as to allow a part of exhaust gas to flow directly to the low-pressure stage turbocharger without passing through the high-pressure stage turbocharger. Further, when the engine is at a high speed, the flow passage of the exhaust gas is switched so that one-stage supercharging is performed by allowing the entire exhaust gas, which has a high flow rate, to flow into the low-pressure stage turbocharger directly.

Further, a small-sized turbocharger is mounted to the high-pressure stage side of the two-stage turbo system, and a large-sized turbocharger is mounted to the low-pressure stage side. Accordingly, it is possible to expand the operational range of the compressor by making use of the range of the low flow rate side of the high-pressure stage turbocharger and the range of the high flow rate side of the low-pressure stage turbocharger. However, the large-sized turbine of the low-pressure stage turbocharger has a greater weight than a small-sized turbine, and thus the rotation speed of the turbine is less likely to increase when the engine is at a low speed. That is, the response performance of the turbine of the low-pressure stage turbocharger deteriorates when the engine is at a low speed, and the boost pressure required when the engine is at a low speed is mainly covered by the high-pressure stage turbocharger. In view of this, proposed is a method for improving the response of the low-pressure stage turbocharger at the time when the engine is at a low speed, while maintaining the flow rate range of the low-pressure stage turbocharger. For instance, Patent Document 1 proposes providing a VG turbo as the low-pressure stage turbocharger. For instance, Patent Document 2 proposes applying a twin scroll to a scroll part of the low-pressure stage turbocharger. When a twin scroll is applied, a scroll part formed along the circumferential direction of the rotational axis of a turbine has a structure with two passages extending side by side in the axial direction of the rotational axis, whereby the flow rate of exhaust gas is introduced into the turbine through two separate passages, which makes it possible to drive the turbine without attenuating the pressure of the exhaust gas.

CITATION LIST

Patent Literature

Patent Document 1: U.S. Pat. No. 8,671,682B
Patent Document 2: US2007/0079612A

SUMMARY

Problems to be Solved

Meanwhile, for a VG turbo, a complicated link mechanism is required to open and close the nozzle vanes, and the structure may become complicated (Patent Document 1). Furthermore, in a case where a twin scroll is provided, the U/C0 property (see FIG. 4 described below) of the turbocharger is similar to that of a turbocharger with a single scroll, and remarkable improvement of response at the time when engine is at a low speed cannot be expected (Patent Document 2). Herein, the U/C0 property refers to a property representing the relationship between the turbine operation speed ratio (U/C0) and the turbine efficiency, where U is the circumferential speed of the turbine T, C0 is a theoretical speed defined from a pressure ratio of the inlet and the outlet of the turbine and the inlet temperature.

In view of the above, an object of at least one embodiment of the present invention is to provide a two-stage turbo system with an improved supercharging response, whereby it is possible to generate a necessary boost pressure over a broad operational range of an engine.

Solution to the Problems (1) A two-stage turbo system according to at least one embodiment of the present invention includes: a high-pressure stage turbocharger having a high-pressure stage turbine disposed in an exhaust passage of an engine; and a low-pressure stage turbocharger which includes a low-pressure stage turbine disposed downstream of the high-pressure stage turbine in the exhaust passage, and which is larger in size than the high-pressure stage turbocharger. The low-pressure stage turbine includes at least two scroll passages including a first scroll passage and a second scroll passage, which together form a scroll part for introducing exhaust gas into a nozzle flow passage of the low-pressure stage turbine. The scroll part is configured such that a first range of the nozzle flow passage into which the exhaust gas passing through the first scroll passage is introduced does not overlap with a second range of the nozzle flow passage into which the exhaust gas passing through the second scroll passage is introduced, in a circumferential direction of the nozzle flow passage.

With the above configuration (1), each of the first scroll passage and the second scroll passage of the low-pressure stage turbine is configured to introduce exhaust gas partially from different directions into the nozzle flow passage formed around the turbine wheel. That is, the scroll part of the low-pressure stage turbine allows exhaust gas discharged from the engine to flow through only a part of the plurality of scroll passages (for instance, the first scroll passage), and thereby it is possible to limit the range of the nozzle flow passage into which exhaust gas is introduced only to the part. Thus, in a case where exhaust gas is introduced into a part of the range of the nozzle flow passage by limiting to only a part of the plurality of scroll passages, it is possible to enhance the flow velocity and pressure of exhaust gas when passing through the turbine wheel compared to a case in which exhaust gas is introduced into the entire range of the nozzle flow passage, and thereby it is possible to drive the low-pressure stage turbine more quickly. Further, with each of the plurality of scroll passages not overlapping with each other in the circumferential direction of the nozzle flow passage, it is possible to shift the highest point of the turbine efficiency in the U/C0 property to the low U/C0 side, compared to a case in which the scroll passages are overlapped in the circumferential direction, like the twin scroll. Thus, it is possible to rotate the low-pressure stage turbine more efficiently at the low rotation speed side of the engine. By providing the scroll part having above features for the low-pressure stage turbine, it is possible to drive the large-sized low-pressure stage turbine of the two-stage turbo system more quickly and efficiently, and to improve the response of supercharging (supercharging effect).

(2) In some embodiments, in the above configuration (1), the exhaust passage includes: a high-pressure stage introduction passage connecting the engine and an inlet of the high-pressure stage turbine; a first low-pressure stage introduction passage connecting an outlet of the high-pressure stage turbine and the first scroll passage of the low-pressure stage turbine; and a second low-pressure stage introduction passage bypassing the high-pressure stage turbine and connecting the engine and the second scroll passage of the low-pressure stage turbine.

With the above configuration (2), the two-stage turbo system is capable of introducing exhaust gas having passed through the high-pressure stage turbine into the first scroll passage of the low-pressure stage turbine, and directly introducing exhaust gas into the second scroll passage of the low-pressure stage turbine without passing through the high-pressure stage turbine. Normally, the two-stage turbo system performs turbocharging by using the high-pressure stage turbocharger to improve the supercharging response, if the rotation speed engine is in the middle rotation speed region or below. Like in this case, by introducing exhaust gas into the nozzle flow passage from the first scroll passage, it is possible to increase the flow rate or the like of exhaust gas after driving the high-pressure stage turbine when introducing the exhaust gas into the nozzle flow passage, and thereby it is possible to rotate the large-sized low-pressure stage turbine of the two-stage turbo system more quickly and efficiently.

(3) In some embodiments, in the above configuration (2), the exhaust passage further includes: a high-pressure stage bypass passage bypassing the high-pressure stage turbine and connecting the engine and the first scroll passage of the low-pressure stage turbine, and a low-pressure stage bypass passage which bypasses the low-pressure stage turbine and which brings an upstream side and a downstream side of the low-pressure stage turbine into communication. The two-stage turbo system further includes a valve device capable of adjusting proportion of a flow rate of the exhaust gas which passes through each of the high-pressure stage introduction passage, the second low-pressure stage introduction passage, the high-pressure stage bypass passage, and the low-pressure stage bypass passage.

With the above configuration (3), with the valve device, it is possible to adjust the proportion of the flow rate of exhaust gas that passes through each of the passages forming the exhaust passage (the high-pressure stage introduction passage, the first low-pressure stage introduction passage, the second low-pressure stage introduction passage, and the high-pressure stage bypass passage). Accordingly, it is possible to switch between the high-pressure stage turbocharger and the low-pressure stage turbocharger, or switch the scroll passage in the scroll part of the low-pressure stage turbocharger, and thereby it is possible to provide a two-stage turbo system having an improved supercharging response, whereby it is possible to generate a necessary boost pressure over a broad operational range of the engine.

(4) In some embodiments, in the above configuration (3), the valve device includes: a first valve disposed in the high-pressure stage introduction passage; a second valve disposed in the second low-pressure stage introduction passage; a third valve disposed in the high-pressure stage bypass passage; and a fourth valve disposed in the low-pressure stage bypass passage.

With the above configuration (4), it is possible to adjust the proportion of the flow rate of exhaust gas passing through each of the high-pressure stage introduction passage, the first low-pressure stage introduction passage, the second low-pressure stage introduction passage, the high-pressure stage bypass passage, and the low-pressure stage bypass passage, with the plurality of valves disposed in the respective passages. Further, with the fourth valve, it is possible to adjust the pressure (boost pressure) on the outlet side of the low-pressure stage compressor of the low-pressure stage turbocharger, and thereby it is possible to prevent abnormal operation of the low-pressure stage turbocharger, such as surging.

(5) In some embodiments, in the above configuration (3), the valve device comprises a single valve capable of adjusting the flow rate of the exhaust gas which passes through each of the high-pressure stage introduction passage, the second low-pressure stage introduction passage, the high-pressure stage bypass passage, and the low-pressure stage bypass passage.

With the above configuration (5), it is possible to adjust proportion of exhaust gas passing through each passage forming the exhaust passage with a single valve, and it is also possible to adjust the pressure (boost pressure) on the outlet side of the low-pressure stage compressor of the low-pressure stage turbocharger, thereby preventing abnormal operation of the low-pressure stage turbocharger, such as surging.

(6) In some embodiments, in any one of the above configurations (3) to (5), the two stage turbo system further includes a control device configured to control the valve device according to a rotation speed of the engine.

With the above configuration (6), the control device controls the valve device, and thereby it is possible to adjust the proportion of the flow rate of exhaust gas passing through each of the first low-pressure stage introduction passage, the second low-pressure stage introduction passage, the high-pressure stage bypass passage, and the low-pressure stage bypass passage, appropriately in accordance with the rotation speed of the engine, and to realize an operation mode for the two-stage turbo system.

(7) In some embodiments, in the above configuration (6), the control device is configured to, if the rotation speed of the engine is in a low rotation speed region, control the valve device so as to allow the exhaust gas to pass through the high-pressure stage introduction passage, and prevent the exhaust gas from passing through each of the second low-pressure stage introduction passage, the high-pressure stage bypass passage, and the low-pressure stage bypass passage.

With the above configuration (7), in a case where the rotation speed of the engine is in the low rotation speed region, exhaust gas is not allowed to flow into the second scroll passage of the low-pressure stage turbine, but is allowed to flow into the first scroll passage via the high-pressure stage turbine. Accordingly, in the low-pressure stage turbocharger, it is possible to improve the response of turbocharging while ensuring an appropriate capacity corresponding to the flow rate of exhaust gas in the low rotation speed region.

(8) In some embodiments, in the above configurations (6) or (7), the control device is configured to, if the rotation speed of the engine is in a middle rotation speed region, control the valve device so as to allow the exhaust gas to pass through the high-pressure stage introduction passage and the second low-pressure stage introduction passage, and prevent the exhaust gas from passing through each of the high-pressure stage bypass passage and the low-pressure stage bypass passage.

With the above configuration (8), in a case where the rotation speed of the engine is in the middle rotation speed region, exhaust gas is allowed to flow into the first scroll passage of the low-pressure stage turbine via the high-pressure stage turbine, and also to flow into both of the first scroll passage and the second scroll passage. Accordingly, it is possible to improve the response of turbocharging with the high-pressure stage turbocharger and the low-pressure stage turbocharger, while ensuring an appropriate capacity corresponding to the flow rate of exhaust gas in the middle rotation speed region.

(9) In some embodiments, in any one of the above configurations (6) to (8), the control device is configured to, if the rotation speed of the engine is in a high rotation speed region, control the valve device to allow the exhaust gas to pass through each of the second low-pressure stage introduction passage and the high-pressure stage bypass passage, and prevent the exhaust gas from passing through each of the high-pressure stage introduction passage and the low-pressure stage bypass passage.

With the above configuration (9), in a case where the rotation speed of the engine is in the high rotation speed region, exhaust gas is not allowed to flow into the high-pressure stage turbine, but is allowed flow into both of the first scroll passage and the second scroll passage of the low-pressure stage turbine. That is, turbocharging is performed by using only the low-pressure stage turbocharger having a high efficiency in response to the flow rate of exhaust gas in the high rotation speed region. Accordingly, appropriate turbocharging can be performed in accordance with a high flow rate of exhaust gas with the low-pressure stage turbocharger.

(10) In some embodiments, in the above configuration (9), the control device is configured to, if the rotation speed of the engine is not lower than a predetermined rotation speed within the high rotation speed region, control the valve device to allow the exhaust gas to pass through each of the second low-pressure stage introduction passage, the high-pressure stage bypass passage, and the low-pressure stage bypass passage, and prevent the exhaust gas from passing through the high-pressure stage introduction passage.

With the above configuration (10), in a case where the rotation speed of the engine is at a high rotation speed side within the high rotation speed region, it is possible to adjust the boost pressure appropriately.

(11) A method of controlling operation of a two stage turbo system according to at least one embodiment of the present invention is a method of controlling the two stage turbo system according to the above (6), which includes a high-pressure stage turbocharger having a high-pressure stage turbine disposed in an exhaust passage of an engine and a low-pressure stage turbocharger which includes a low-pressure stage turbine disposed downstream of the high-pressure stage turbine in the exhaust passage and which is larger in size than the high-pressure stage turbocharger, and the method includes: a rotation speed acquisition step of obtaining a rotation speed of the engine; a region determination step of determining a rotation speed region of the rotation speed of the engine; and a low rotation speed time control step of controlling, if the rotation speed of the engine is within a low rotation speed region, a valve device so as to allow exhaust gas to pass through a first scroll passage of the low-pressure stage turbocharger, and prevent the exhaust gas from flowing into a second scroll passage of the low-pressure stage turbocharger.

With the above configuration (11), it is possible to improve the response of the low-pressure stage turbine in a case where the rotation speed of the engine is in the low rotation speed region. Moreover, similarly to the above (1) to (5), it is possible to drive the large-sized low-pressure stage turbine of the two-stage turbo system more quickly and efficiently, and to improve the response of supercharging.

(12) In some embodiments, in the above configuration (11), the method further includes a middle rotation speed time control step of controlling, if the rotation speed of the engine is in a middle rotation speed region, the valve device so as to allow the exhaust gas to pass through both of the first scroll passage and the second scroll passage of the low-pressure stage turbocharger.

With the above configuration (12), it is possible to improve the response of supercharging in a case where the rotation speed of the engine is in the middle rotation speed region.

Advantageous Effects

According to at least one embodiment of the present invention, provided is a two-stage turbo system with an improved supercharging response, whereby it is possible to generate a necessary boost pressure over a broad operational range of an engine.

BRIEF DESCRIPTION OF DRAWINGS

FIG. 6C is a schematic diagram for describing the operation mode of the two-stage turbo system corresponding to FIG. 5A, showing the operation mode in a case where the rotation speed of the engine is in a high rotation speed region.

FIG. 6D is a schematic diagram for describing the operation mode of the two-stage turbo system corresponding to FIG. 5A, showing the operation mode in a case where the rotation speed of the engine is at a high rotation speed side within the high rotation speed region.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
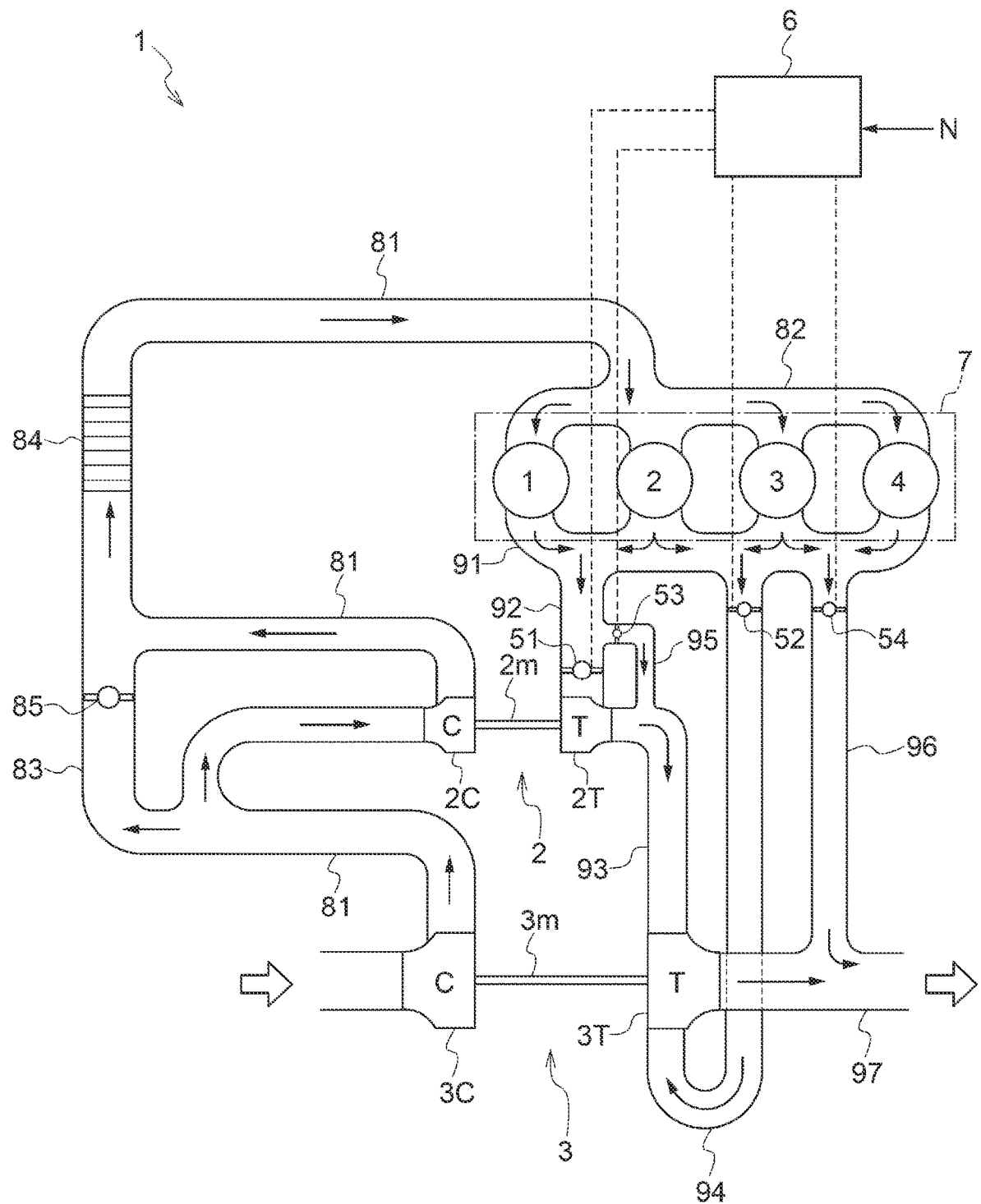
FIG. 1 is a schematic diagram showing a two-stage turbo system applied to an engine according to an embodiment of the present invention.
Figure 2:
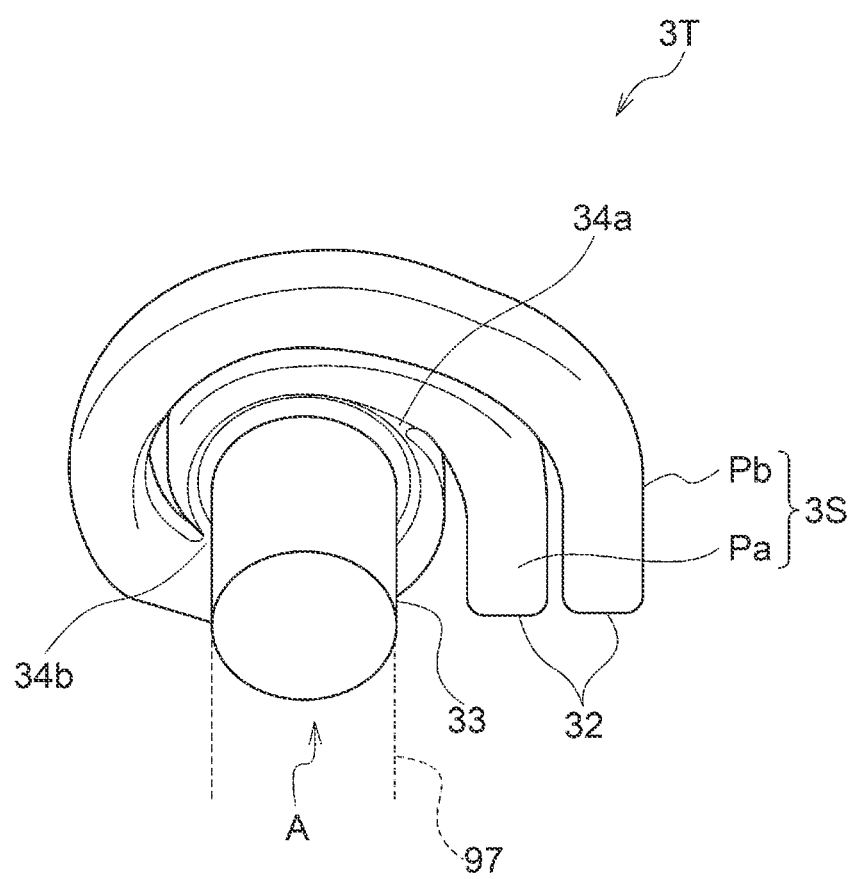
FIG. 2 is a schematic diagram of a scroll part of a low-pressure stage turbine of a low-pressure stage turbocharger according to an embodiment of the present invention. The scroll part has a double scroll structure including two scroll passages.
Figure 3:
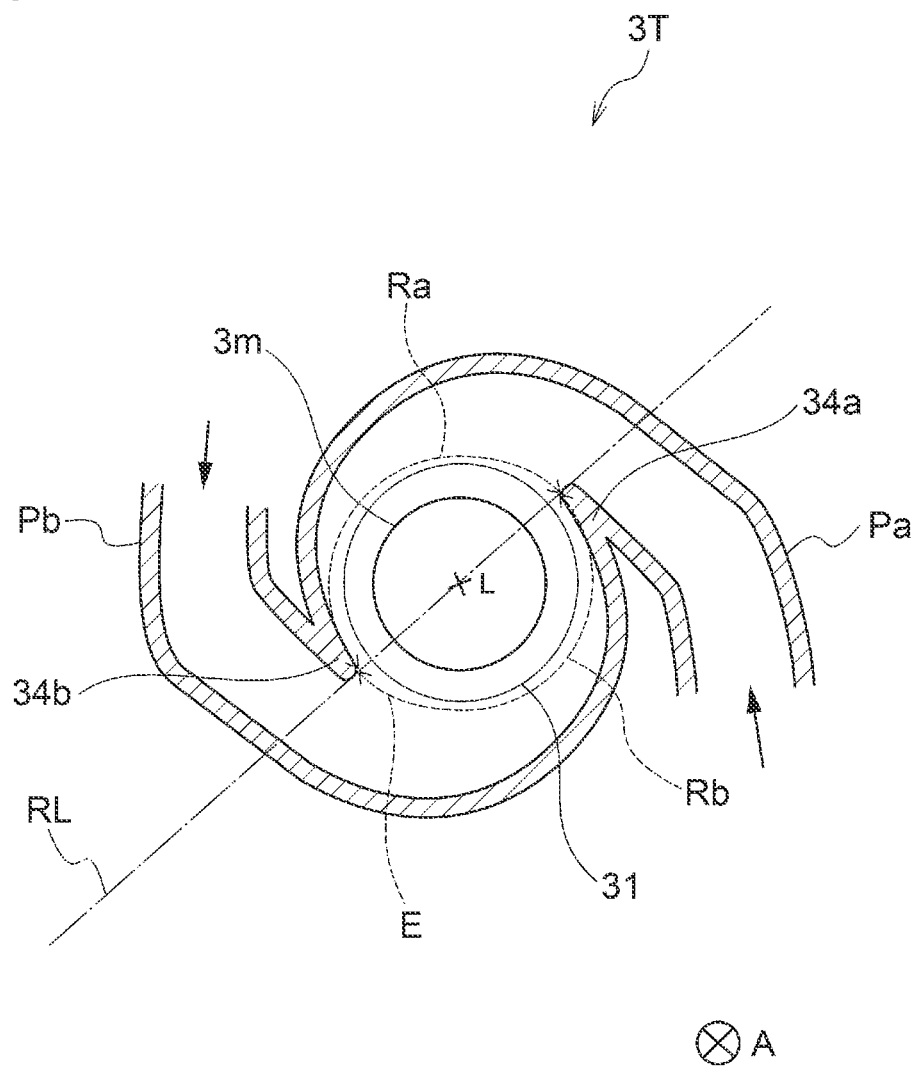
FIG. 3 is a cross-sectional view of a scroll part of a low-pressure stage turbine of a low-pressure stage turbocharger according to an embodiment of the present invention, taken along the circumferential direction, which is a view of a part of the scroll part shown in FIG. 2 as seen in the direction A.
Figure 4:
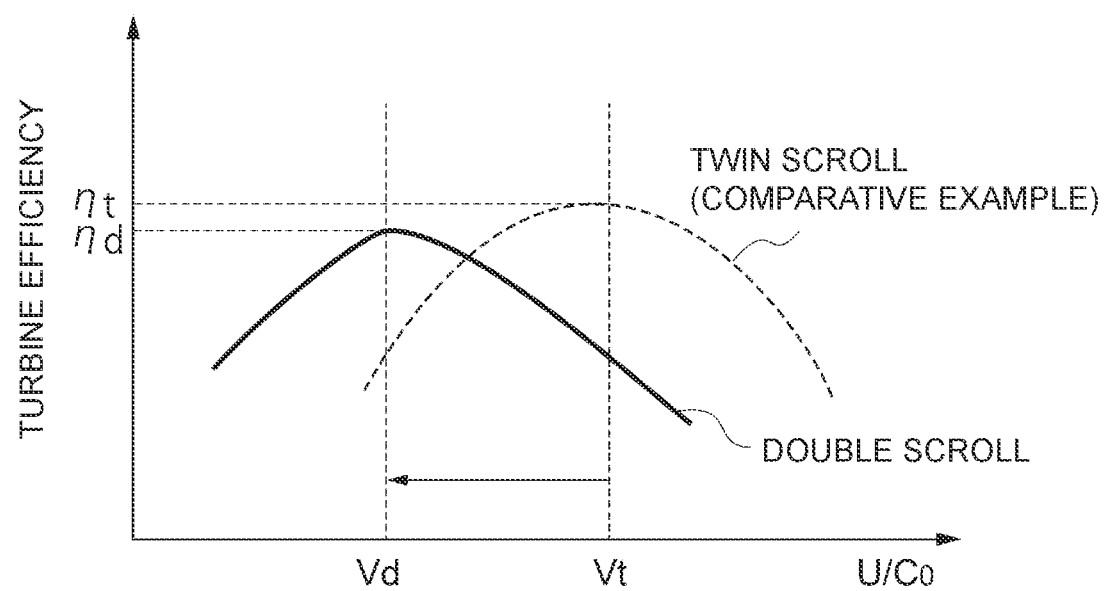
FIG. 4 is a diagram for describing the U/C0 property of the low-pressure stage turbocharger including a scroll part having a double scroll structure according to an embodiment of the present invention.
Figure 5A:
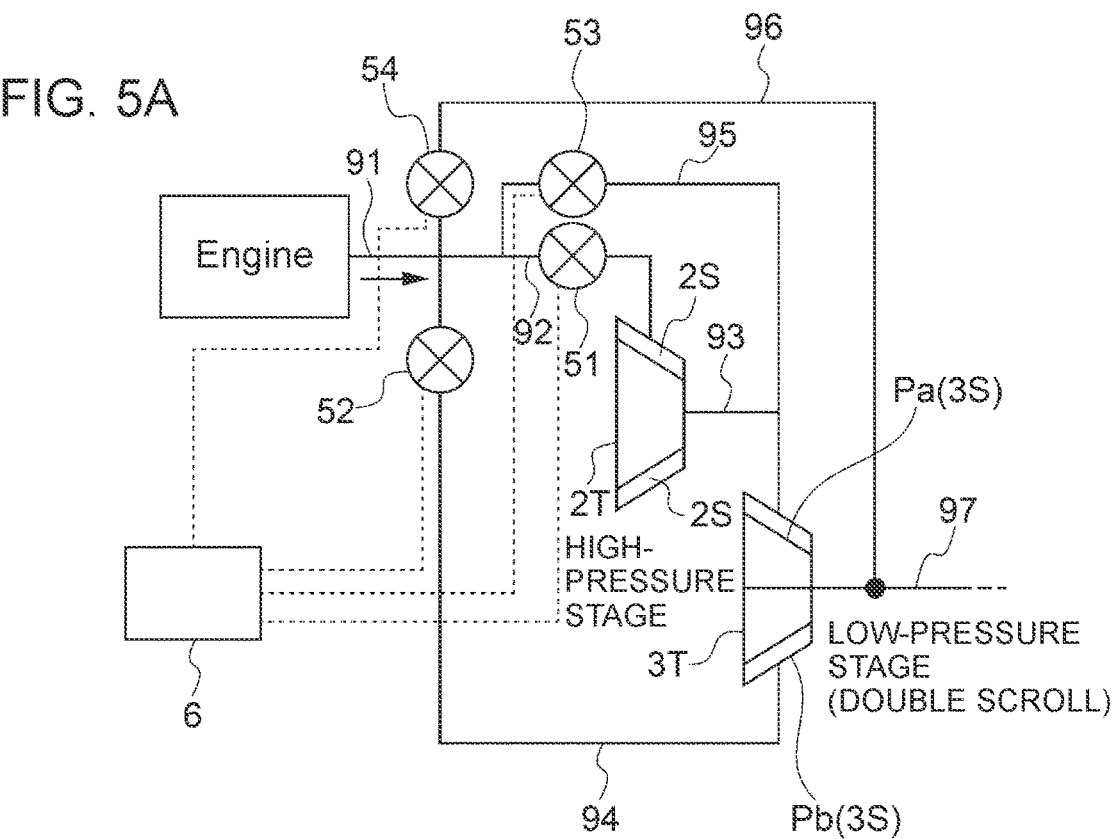
FIG. 5A is a simplified schematic diagram showing the exhaust passage side of the two-stage turbo system applied to an embodiment of the present invention, where the valve device includes a plurality of valves.
Figure 5B:
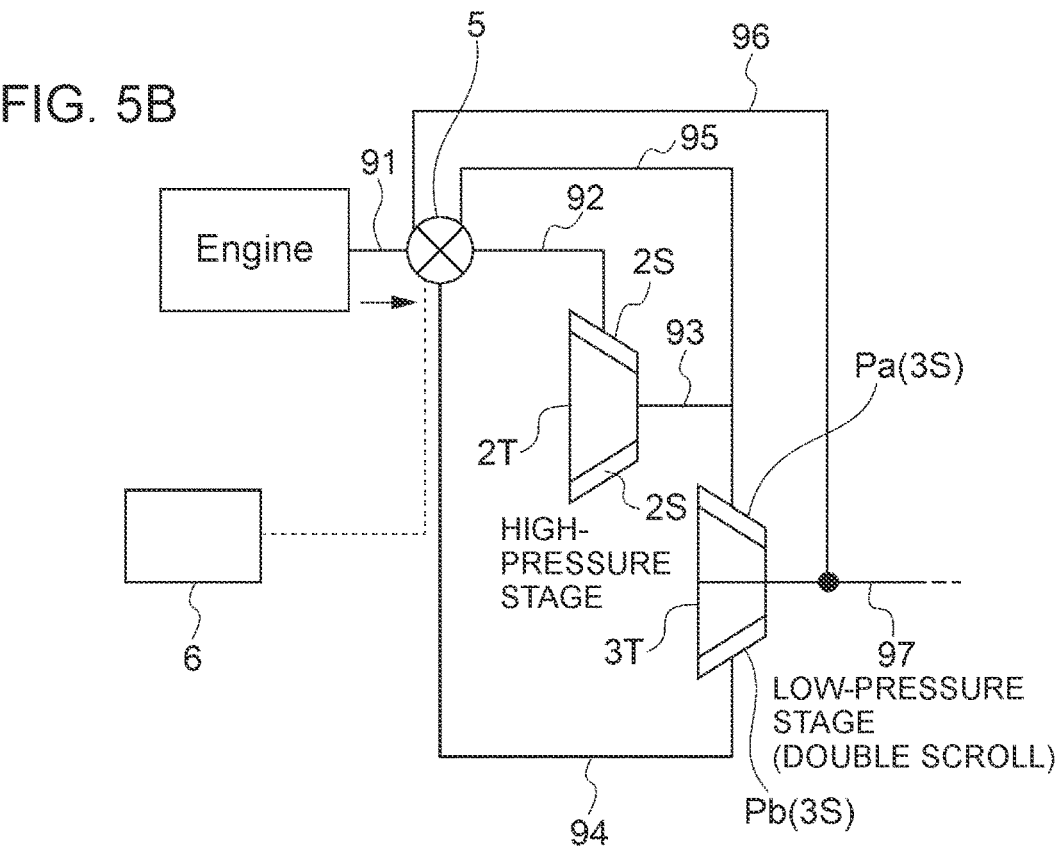
FIG. 5B is a simplified schematic diagram showing the exhaust passage side of the two-stage turbo system according to an embodiment of the present invention, where the valve device includes a single valve.

FIG. 1 is a schematic diagram showing a two-stage turbo system 1 applied to an engine 7 according to an embodiment of the present invention. FIG. 2 is a schematic diagram of a scroll part 3S of a low-pressure stage turbine 3T of a low-pressure stage turbocharger 3 according to an embodiment of the present invention. The scroll part 3S has a double scroll structure including two scroll passages P. FIG. 3 is a cross-sectional view of a scroll part 3S of a low-pressure stage turbine 3T of a low-pressure stage turbocharger 3 according to an embodiment of the present invention, taken along the circumferential direction, which is a view of a part of the scroll part 3S shown in FIG. 2 as seen in the direction A. FIG. 4 is a diagram for describing the U/C0 property of a low-pressure stage turbocharger including a scroll part 3S having a double scroll structure according to an embodiment of the present invention. FIGS. 5A to 5D are each a simplified schematic diagram showing the side of an exhaust passage 9 of the two-stage turbo system 1 according to an embodiment of the present invention. FIGS. 6A to 6D are each a schematic diagram for describing the operation mode of the two-stage turbo system 1 corresponding to FIG. 5A. Further, FIGS. 7A to 7D are each a schematic diagram for describing the operation mode of the two-stage turbo system 1 corresponding to FIG. 5B.

As shown in FIGS. 1 to 7D, the two-stage turbo system 1 is a supercharging system to be applied to the engine 7. The engine 7 is, for instance, a diesel engine or a gasoline engine including one or more cylinders (four cylinders in FIG. 1). Furthermore, the two-stage turbo system 1 can be also applied to an engine 7 of various fields, such as automobile, truck, bus, ship, industrial engine, etc.

As shown in FIGS. 1 to 7D, the two-stage turbo system 1 includes two turbochargers: a high-pressure stage turbocharger 2 and a low-pressure stage turbocharger 3. Each of the turbochargers (the high-pressure stage turbocharger 2 and the low-pressure stage turbocharger 3) includes a compressor C (2C, 3C) disposed in an intake passage 8 of the engine 7 and a turbine T (2T, 3T) disposed in an exhaust passage 9 of the engine 7. The turbine T includes a turbine housing and a turbine wheel (reference numeral 31 in FIG. 3), and the compressor C includes a compressor housing and a compressor wheel. Further, the compressor wheel of the compressor C and the turbine wheel of the turbine T are coupled via a shaft m (2m, 3m). Further, exhaust gas discharged from the combustion chamber (not shown) of the engine 7 rotary-drives the turbine wheel when passing through the exhaust passage 9 toward the outside. Accordingly, the compressor wheel coupled coaxially to the turbine wheel 31 via the shaft m is rotary driven, and intake air passing through the intake passage 8 is compressed. More specifically, exhaust gas after passing through the scroll part S of the turbocharger blows into the turbine wheel from a nozzle flow passage E, and thereby the turbine T is rotary driven (see FIG. 3).

The above high-pressure stage turbocharger 2 and the low-pressure stage turbocharger 3 are connected in series in the two-stage turbo system 1. Specifically, as shown in FIGS. 1, 5A to 7D, in the exhaust passage 9, the turbine T of the high-pressure stage turbocharger 2 (high-pressure stage turbine 2T) is disposed on the upstream side in the exhaust passage 9, which is a side relatively close to the engine 7 with respect to the flow direction of the exhaust gas, and the turbine T of the low-pressure stage turbocharger 3 (low-pressure stage turbine 3T) is disposed on the downstream side in the exhaust passage 9, which is a side relatively far from the engine 7 with respect to the flow direction of exhaust gas compared to the high-pressure stage turbine 2T. Furthermore, in the intake passage 8, the compressor C of the low-pressure stage turbocharger 3 (low-pressure stage compressor 3C) is disposed on the upstream side in the intake passage 8, and the compressor C of the high-pressure stage compressor 2 (high-pressure stage compressor 2C) is disposed in the intake passage 8 on the downstream side of the low-pressure stage compressor 3C (see FIG. 1). As described above, the above two superchargers are disposed in series in the intake passage 8 and the exhaust passage 9.

Further, the low-pressure stage turbocharger 3 is larger in size than the high-pressure stage turbocharger 2. Normally, a larger turbocharger has more weight, and a weight increase causes the inertia to increase. Thus, with a size increase of the turbocharger, the rotation speed of the turbine T becomes less likely to increase at the low speed time of the engine 7, and the response performance deteriorates. On the other hand, a larger turbocharger has a better turbine efficiency in a region where the exhaust gas flow rate is high, compared to a smaller turbocharger. Contrary, a smaller turbocharger has a better turbine efficiency in a region where the flow rate of exhaust gas is low, compared to a larger supercharger, and thus the turbine T can be rotary driven efficiently with a low flow rate of exhaust gas. By utilizing the above characteristics of turbochargers, the two-stage turbo system 1 is configured to cover the flow rate range of the low flow rate side with the relatively small high-pressure stage turbocharger 2, and to cover the flow rate range of the high flow rate side with the relatively large low-pressure stage turbocharger 3.

Further, as described below, the two-stage turbo system 1 controls the valve device 5 disposed in the exhaust passage 9 with the control device 6, for instance, to switch the flow passage of the exhaust passage 9 (exhaust passages I to IV described below) in accordance with the operation conditions of the engine 7, thereby switching the operation mode (turbocharger to be used) in the single stage supercharging and the two-stage supercharging. Accordingly, the response at a low speed time of the engine 7 is improved, while generating a necessary boost pressure over a broad operational range of the engine 7. Further, the above single stage supercharging refers to an operation mode in which the engine 7 is supercharged by using the low-pressure stage turbocharger 3 alone, and the two-stage supercharging refers to an operation mode in which supercharging is performed by using both of the high-pressure stage turbocharger 2 and the low-pressure stage turbocharger 3.

Herein, the scroll part 3S of the low-pressure stage turbine 3T of the low-pressure stage turbocharger 3 of the present embodiment will be described with reference to FIGS. 2 and 3. The scroll part 3S forms a part of the turbine housing. As shown in FIGS. 2 and 3, the scroll part 3S of the low-pressure stage turbine 3T of the present embodiment includes at least two scroll passages P: the first scroll passage Pa, and the second scroll passage Pb. Further, as shown in FIG. 3, the first range Ra of the nozzle flow passage E into which exhaust gas passing through the first scroll passage Pa is introduced does not overlap with the second range Rb of the nozzle flow passage E into which exhaust gas passing through the second scroll passage pb is introduced, in the circumferential direction of the nozzle flow passage E. The above nozzle flow passage E is a space (flow passage) positioned at a boundary connecting a wheel housing chamber 31r that houses the turbine wheel 31 and the scroll part 3S, and is formed by the inner wall of the turbine housing, around the turbine wheel 31 of the low-pressure stage turbine 3T (see FIG. 3). In the embodiment shown in FIGS. 1 to 7D, as shown in FIG. 3, exhaust gas having entered from the inlet 32 (see FIG. 2) of the scroll part S (low-pressure stage turbine 3T) and passed through the first scroll passage Pa blows into the turbine wheel 31 via the first range Ra of the nozzle flow passage E, while exhaust gas having passed through the second scroll passage Pa blows into the turbine wheel 31 via the second range Rb of the nozzle flow passage E. Further, after blowing into the turbine wheel 31 from the nozzle flow passage E, exhaust gas passes through a low-pressure stage downstream passage 97 from an outlet 33 of the low-pressure stage turbine 3T disposed along the axial direction of the rotational axis L of the shaft m.

Further, in the embodiment shown in FIGS. 1 to 7D, as shown in FIGS. 2 and 3, the scroll part 3S of the low-pressure stage turbine 3T has a double scroll structure including the first scroll passage Pa and the second scroll passage Pb described above. More specifically, in the double scroll structure, the first scroll passage Pa and the second scroll passage Pb are disposed next to each other along the circumferential direction.

Furthermore, in the embodiment shown in FIGS. 1 to 7D, as shown in FIG. 3, the nozzle flow passage E is formed into an annular shape over the entire outer perimeter of the turbine wheel 31 shown in a circular shape. Herein, the turbine housing includes two tongues 34 formed thereon, including a tongue on the side connected to the passage wall of the radially inner side of the first scroll passage Pa (first tongue 34a) and a tongue on the side connected to the passage wall of the radially outer side of the first scroll passage Pa (second tongue 34b). In other words, the first tongue 34a is the tongue on the side connected to the passage wall on the radially outer side of the second scroll passage Pa, and the second tongue 34b is the tongue on the side connected to the passage wall on the inner side of the second scroll passage Pa. Further, in the cross section (see FIG. 3) taken along the circumferential direction of the rotational axis L of the turbine wheel 31, where a boundary line RL is a line passing through the first tongue 34a, the second tongue 34b, and the rotational axis L of the turbine wheel 31, the first range Ra of the nozzle flow passage E is formed on a side (semi-perimeter portion) of the boundary line RL, and the second range Rb of the nozzle flow passage E is formed on the opposite side (semi-perimeter portion) of the boundary line RL. As described above, the scroll part 3S is formed such that the first range Ra and the second range Rb do not have a range (portion) overlapping with each other. In other words, the passage walls of the first scroll passage Pa and the second scroll passage Pb are connected to different portions of the turbine housing forming the nozzle flow passage E (see FIG. 2).

Further, as described below, in a case where the entire flow rate of exhaust gas discharged from the engine 7 is introduced into only one of the two scroll passages P, the first scroll passage Pa or the second scroll passage Pb, the size of the nozzle flow passage E upon introduction of the entire amount of the flow rate of exhaust gas would be smaller than that in a case where exhaust gas is introduced into the two scroll passages P (Pa, Pb) separately. In the embodiment shown in FIGS. 1 to 7D, the first range Ra and the second range Rb have the same angular range (same size). The range of the nozzle flow passage E into which exhaust gas can be introduced from one of the scroll passages is about a half of the entire perimeter of the nozzle flow passage E. Thus, exhaust gas can be introduced into the low-pressure stage turbine 3T without dispersing (attenuating) the pressure of exhaust gas over the entire range of the nozzle flow passage E upon introduction of exhaust gas into the nozzle flow passage E, and thus it is possible to drive the low-pressure stage turbine 3T more quickly at the low speed time of the engine 7.

In contrast, for instance, also in a case where a twin scroll is applied to the scroll part 3S of the low-pressure stage turbine 3T, two passages are formed in the scroll part 3S by the twin scroll, but each of the two passages of the twin scroll are configured to introduce exhaust gas uniformly over the entire perimeter of the turbine wheel 31. That is, the two passages of the twin scroll introduce exhaust gas into the same range of the nozzle flow passage E, and thus the ranges of the nozzle flow passage E in communication with the respective two scroll passages have an overlapping portion in the circumferential direction of the nozzle flow passage E. Further, when the entire amount of exhaust gas is introduced into one of the two scroll passages, the exhaust gas is introduced over the entire perimeter of the turbine wheel 31. Thus, for instance, if the size (weight) of the turbine T is large relative to the flow rate of exhaust gas, as a result of the pressure of exhaust gas being dispersed over the entire range of the nozzle flow passage E, particularly at an operational point where the flow rate of exhaust gas is low such as the low speed time of the engine 7, a sufficient pressure ratio (differential pressure between the pressure surface and the suction surface at each blade) cannot be obtained, and it is difficult to rotary-drive the large-sized low-pressure stage turbine 3T quickly.

Furthermore, with the scroll part 3S of the low-pressure stage turbine 3T having the above described double scroll structure, as shown in FIG. 4, for the U/C0 property, which is a turbine efficiency with respect to the speed ratio (U/C0) of the circumferential speed of the turbine T and the theoretical speed, it is possible to shift the highest point of the turbine efficiency of the low-pressure stage turbine 3T toward the low speed ratio side than that in a case where a twin scroll is provided. The U/C0 property represents the relationship between the turbine efficiency and the turbine operation speed ratio (U/C0), which is a speed ratio of the circumferential speed (U) of the turbine T to the theoretical speed (C0), and is shown in a chart where x-axis is the turbine operation speed ratio (U/C0) and y-axis is the turbine efficiency. Herein, the circumferential speed (U) of the turbine T is the rotation speed obtained from the number of rotation of the turbine T, and the theoretical speed (C0) of the turbine T is a speed defined from a pressure ratio of the inlet and the outlet of the turbine and the inlet temperature. Further, when the highest point of the turbine efficiency of the U/C0 property shifts toward the low speed ratio side, it means that the efficiency is high at the low speed time of the engine, such as the start of rotation of the turbine T where the circumferential speed (U) of the turbine T is low relative to the theoretical speed (C0). Thus, in a case where the flow rate of exhaust gas is low, such as the low speed time of the engine 7, it is possible to rotate the low-pressure stage turbine 3T efficiently.

In the example shown in FIG. 4, the U/C0 property is shown for two turbochargers which are different form each other only in the structure of the scroll part, which is a twin scroll structure or a double scroll structure. Specifically, the turbine operation speed ratio at the highest point ($\eta$t) of the turbine efficiency of the turbocharger including the twin scroll is Vt, and the turbine operation speed ratio of the highest point ($\eta$d) of the turbine efficiency of the turbocharger including the double scroll structure is Vd. Further, both turbochargers each have a U/C0 property having a convex shape protruding from x-axis across the speed ratio corresponding to the highest point ($\eta$t, $\eta$d). Further, while $\eta$d is smaller than $\eta$t and the turbine efficiency is lower, Vd is smaller than Vt, and the U/C0 property of the turbocharger with the double structure having a convex is overall shifted toward the low speed ratio side compared to the U/C0 property of the turbocharger with the twin scroll having a convex. Thus, when comparing the U/C0 properties of the two turbochargers at the same speed ratio on the low speed ratio side, at the speed ratio Vd for instance, the turbocharger with the double scroll structure has a higher turbine efficiency than the turbocharger with the twin scroll, and thus has a high efficiency at the low-speed side of the engine 7.

With the above configuration, each of the first scroll passage Pa and the second scroll passage Pb is configured to introduce exhaust gas partially from different directions into the nozzle flow passage E formed around the turbine wheel 31. That is, the scroll part 3S of the low-pressure stage turbine 3T allows exhaust gas discharged from the engine 7 only to a part of the plurality of scroll passages P (in FIGS. 1 to 4, the first scroll passage P1), and thereby it is possible to limit the range of the nozzle flow passage E into which exhaust gas is introduced only to the part. Thus, in a case where exhaust gas is introduced into a part of the range of the nozzle flow passage E by limiting to only a part of the plurality of scroll passages P, it is possible to enhance the flow velocity and pressure of exhaust gas when passing through the turbine wheel 31 compared to a case in which exhaust gas is introduced into the entire range of the nozzle flow passage E, and thereby it is possible to drive the low-pressure stage turbine 3T more quickly.

Further, with each of the plurality of scroll passages P not overlapping with each other in the circumferential direction of the nozzle flow passage E, it is possible to shift the highest point of the turbine efficiency in the U/C0 property to the low U/C0 side, compared to a case in which the scroll passages P are overlapped in the circumferential direction, like the twin scroll. Thus, it is possible to rotate the low-pressure stage turbine 3T more efficiently at the low rotation speed side of the engine 7. By providing the scroll part 3S having above features for the low-pressure stage turbine 3T, it is possible to drive the large-sized low-pressure stage turbine 3T of the two-stage turbo system 1 more quickly and efficiently, and to improve the response of supercharging. In this regard, although the response performance of a typical low-pressure stage turbocharger is low at the low speed time of the engine, as described above, and thus the high-pressure stage turbocharger mainly covers the boost pressure required at the low speed time of the engine, in the present embodiment, it is possible to increase the contribution from the low-pressure stage turbocharger 3, and the response of supercharging is improved.

In the embodiment shown in FIGS. 1 to 7D, the entire perimeter of the nozzle flow passage E is divided equally into the first range Ra and the second range Rb not overlapping with each other across the boundary line RL. However, this embodiment is not limitative. The entire range formed by the first range Ra and the second range Rb does not need to be the entire perimeter of the nozzle flow passage E. In other words, in a partial range of the nozzle flow passage E having an annular shape, exhaust gas may not necessarily be introduced directly after passing through the scroll passage P. Further, in the embodiment shown in FIGS. 1 to 7D, the angular range of the first range Ra and the angular range of the second range Rb are the same. Nevertheless, in some embodiments, the angular range of the first range Ra and the angular range of the second range Rb may be different. It is possible to improve the rotation torque of the turbine wheel with exhaust gas in accordance with the angular range of the first range Ra to which the first low-pressure stage introduction passage 93 is connected. Further, in the embodiment shown in FIGS. 1 to 7D, the scroll part 3S of the low-pressure stage turbine 3T has the double scroll structure as described above. Nevertheless, in another embodiment, the scroll part 3S of the low-pressure stage turbine 3T may include two or more scroll passages P. In this case, the scroll part 3S is configured such that the ranges of the nozzle flow passage E corresponding to the respective passages of the at least two scroll passages P (the first scroll passage Pa and the second scroll passage Pb) do not overlap.

Next, the overall configuration of the engine 7 including the two-stage turbo system 1 will be described with reference to FIGS. 1, 5A to 7D. While the intake passage 8 of the engine 7 is not shown in FIGS. 5A to 7D, the intake passage 8 shown in FIG. 1 is connected to the engine 7.

In the embodiment shown in FIGS. 1 to 7D, as shown in FIG. 1, two types of flow passages are disposed in the intake passage 8 of the engine 7. Specifically, the intake passage 8 of the engine 7 includes a main intake passage 81 for supplying intake air (air) taken in from an intake duct (not shown) to the engine 7, an intake manifold 82 for distributing intake air from the main intake passage 81 to each of the plurality of cylinders of the engine 7, and a high-pressure stage compressor bypass passage 83. Furthermore, a compressor bypass valve 85 is disposed in the high-pressure stage compressor bypass passage 83. Further, as the control device 6 (described below) or the like controls the opening degree of the compressor bypass valve 85, the flow passage along the intake passage 8 for the intake air to pass through is determined.

In the configuration of the intake passage 8 having the above described configuration, the first flow passage includes the main intake passage 81 and the intake manifold 82. In the main intake passage 81, disposed in this order from the upstream side are the low-pressure stage compressor 3C of the low-pressure stage turbocharger 3, the high-pressure stage compressor 2C of the high-pressure stage turbocharger 2, and the inter cooler 84 for increasing the intake density by cooling. Further, the intake air passes through the main intake passage 81 in this order and then passes through the intake manifold 82, thereby being supplied to the engine 7 from the intake duct without passing through the high-pressure stage compressor bypass passage 83.

The second flow passage includes the main intake passage 81, the high-pressure stage compressor bypass passage 83, and the intake manifold 82. The intake air can pass through the second flow passage only when the compressor bypass valve 85 is open. The first and second ends of the high-pressure stage compressor bypass passage 83 are connected to the vicinity of the outlet (downstream side) of the low-pressure stage compressor 3C in the intake passage 81 and the vicinity of the inlet (upstream side) of the inter cooler 84, respectively. Further, the intake air passes through the low-pressure stage compressor 3C of the low-pressure stage turbocharger 3, the high-pressure stage compressor bypass passage 83, the inter cooler 84, and the intake manifold 82 in this order, thereby being supplied to the engine 7 from the intake duct. As described below, the two-stage turbo system 1 is configured to perform the first stage turbocharging with only the low-pressure stage turbocharger 3 at the high speed time of the engine 7, and by opening the compressor bypass valve 85, it is possible to prevent deterioration of pressure loss due to passage through the high-pressure stage compressor 2C of the high-pressure stage turbocharger 2.

Further, in the exhaust passage 9 of the engine 7, as shown in FIGS. 1, 5A to 7D, four types of flow passage are provided, which are different from one another, as to whether the exhaust gas passes through the high-pressure stage turbine 2T and the low-pressure stage turbine 3T disposed in the exhaust passage 9, and how the exhaust gas passes through the low-pressure stage turbine 3T. Furthermore, the exhaust passage 9 of the engine 7 includes an exhaust manifold 91 which collects exhaust gas (combustion gas) discharged from the respective cylinders of the engine 7. Further, a common feature of the four types of flow passage is that each flow passage is connected to the engine 7 via the above described exhaust manifold 91. Each of the four types of flow passage will be described (see FIGS. 5A to 7D).

The first flow passage (exhaust gas flow passage I) is a flow passage for supplying exhaust gas discharged from the engine 7 to the first scroll passage Pa of the low-pressure stage turbine 3T, via the high-pressure stage turbine 2T. In the embodiment shown in FIGS. 1 to 7D, the exhaust passage 9 includes a high-pressure stage introduction passage 92 connecting the engine 7 and the inlet (scroll part 2S) of the high-pressure stage turbine 2T, and a first low-pressure stage introduction passage 93 connecting the outlet of the high-pressure stage turbine 2T and the first scroll passage Pa of the low-pressure stage turbine 3T.

That is, exhaust gas discharged from the engine 7 passes through the high-pressure stage introduction passage 92 and flows into the first low-pressure stage introduction passage 93, thereby being supplied to the first scroll passage Pa of the low-pressure stage turbine 3T via the high-pressure stage turbine 2T.

The second flow passage (exhaust gas flow passage II) is a flow passage for supplying exhaust gas discharged from the engine 7 to the second scroll passage Pb of the low-pressure stage turbine 3T, while bypassing the high-pressure stage turbine 2T. In the embodiment shown in FIGS. 1 to 7D, the exhaust passage 9 includes a second low-pressure stage introduction passage 94 connecting the engine 7 and the second scroll passage Pb of the low-pressure stage turbine 3T, while bypassing the high-pressure stage turbine 2T. That is, exhaust gas discharged from the engine 7 passes through the second low-pressure stage introduction passage 94, thereby being directly supplied to the second scroll passage Pb of the low-pressure stage turbine 3T while bypassing the high-pressure stage turbine 2T.

With the above configuration, the two-stage turbo system 1 is capable of introducing exhaust gas having passed through the high-pressure stage turbine 2T into the first scroll passage Pa of the low-pressure stage turbine 3T, and directly introducing exhaust gas into the second scroll passage Pb of the low-pressure stage turbine 3T without passing through the high-pressure stage turbine 2T. As described below, the two-stage turbo system 1 performs turbocharging by using the high-pressure stage turbocharger 2 to improve the supercharging response, if the rotation speed of the engine 7 is in the middle rotation speed region or below. Like in this case, by introducing exhaust gas into the nozzle flow passage E from the first scroll passage Pa, it is possible to increase the flow rate or the like of exhaust gas after driving the high-pressure stage turbine 2T when introducing the exhaust gas into the nozzle flow passage E, and thereby it is possible to improve the turbocharging response by rotating the large-sized low-pressure stage turbine 3T of the two-stage turbo system 1 more quickly and efficiently.

Further, the third flow passage (exhaust gas flow passage III) is a flow passage for supplying exhaust gas discharged from the engine 7 to the first scroll passage Pa of the low-pressure stage turbine 3T, not via the high-pressure stage turbine 2T. In the embodiment shown in FIGS. 1 to 7D, the exhaust passage 9 includes a high-pressure stage bypass passage 95 connecting the engine 7 and the first scroll passage Pa of the low-pressure stage turbine 3T, while bypassing the high-pressure stage turbine 2T. The high-pressure stage bypass passage 95 connects the high-pressure stage introduction passage 92 and the first low-pressure stage introduction passage 93, thereby connecting the engine 7 and the first scroll passage Pa of the low-pressure stage turbine 3T while bypassing the high-pressure stage turbine 2T. Further, in some embodiments, the exhaust manifold 91 and the first low-pressure stage introduction passage 93 may be connected to the high-pressure stage bypass passage 95. That is, exhaust gas discharged from the engine 7 passes through the high-pressure stage bypass passage 95 to bypass the high-pressure stage turbine 2T, thereby being supplied to the first scroll passage Pa of the low-pressure stage turbine 3T.

The fourth flow passage (exhaust gas flow passage IV) is a flow passage for supplying exhaust gas discharged from the engine 7 to the exhaust passage 9 downstream of the low-pressure stage turbine 3T, without passing either one of the high-pressure stage turbine 2T or the low-pressure stage turbine 3T. In the embodiment shown in FIGS. 1 to 7D, the exhaust passage 9 includes a low-pressure stage bypass passage 96 connecting the upstream side and the downstream side of the low-pressure stage turbine 3T, bypassing the low-pressure stage turbine 3T. Further, the low-pressure stage bypass passage 96 connects the exhaust manifold 91 to the low-pressure stage downstream passage 97 connected to the outlet of the low-pressure stage turbine 3T. Further, in some embodiments, the second low-pressure stage introduction passage 94 may be connected to the low-pressure stage downstream passage 97. Accordingly, it is possible to reduce the flow rate of exhaust gas passing through the first scroll passage Pa and the second scroll passage Pb of the low-pressure stage turbine 3T, simultaneously.

Furthermore, in the exhaust passage 9 of the engine 7, as shown in FIGS. 1, 5A to 7D, a valve device 5 capable of adjusting the flow rate of exhaust gas passing through the above described four types of flow passage is disposed. In the embodiment shown in FIGS. 1 to 7D, the valve device 5 is configured to be capable of adjusting proportion of the flow rate of exhaust gas that passes through each of the high-pressure stage introduction passage 92, the second low-pressure stage introduction passage 94, the high-pressure stage bypass passage 95, and the low-pressure stage bypass passage 96 described above. Accordingly, it is possible to switch between the high-pressure stage turbocharger 2 and the low-pressure stage turbocharger 3, or switch the scroll passage P in the scroll part 3S of the low-pressure stage turbocharger 3, and thereby it is possible to provide a two-stage turbo system 1 having an improved supercharging response, whereby it is possible to generate a necessary boost pressure over a broad operational range of the engine 7.

Furthermore, the configuration of the valve device 5 will be described. In the embodiment shown in FIGS. 5A, 6A to 6D, the valve device 5 includes a first valve 51 disposed in the high-pressure stage introduction passage 92, a second valve 52 disposed in the second low-pressure stage introduction passage 94, a third valve 53 disposed in the high-pressure stage bypass passage 95, and a fourth valve 54 disposed in the low-pressure stage bypass passage 96. At least one of the above valves (51 to 54) may by a valve whose opening degree can be adjusted (linear-controlled) continuously between a fully-open position and a fully-closed position, and the remaining valves may be switchable between a fully-open state and a fully-open position alternatively. For instance, with at least the first valve 51 or the second valve 52 being linearly controllable, it is possible to adjust the flow rate ratio of exhaust gas passing through the first scroll passage Pa and the second scroll passage Pb of the low-pressure stage turbine 3T. Accordingly, as described below, it is possible to adjust the proportion of the flow rate of exhaust gas passing through each of the high-pressure stage introduction passage 92, the first low-pressure stage introduction passage 93, the second low-pressure stage introduction passage 94, the high-pressure stage bypass passage 95, and the low-pressure stage bypass passage 96, with the plurality of valves (51 to 54) disposed in the respective passages. Further, with the fourth valve 54, it is possible to adjust the pressure (boost pressure) on the outlet side of the low-pressure stage compressor 3C of the low-pressure stage turbocharger 3, and thereby it is possible to prevent abnormal operation of the low-pressure stage turbocharger 3, such as surging.

In some other embodiments, as shown in FIGS. 5B, 7A to 7D, the valve device 5 is a single valve capable of adjusting proportion of the flow rate of exhaust gas that passes through each of the high-pressure stage introduction passage 92, the second low-pressure stage introduction passage 94, the high-pressure stage bypass passage 95, and the low-pressure stage bypass passage 96. Accordingly, it is possible to adjust proportion of exhaust gas passing through each flow passage forming the exhaust passage 9 with a single valve, and it is also possible to adjust the pressure (boost pressure) on the outlet side of the low-pressure stage compressor 3C of the low-pressure stage turbocharger 3, thereby preventing abnormal operation of the low-pressure stage turbocharger 3, such as surging.

Further, in some embodiments, as shown in FIGS. 1, 5A to 7D, the two-stage turbo system 1 further includes a control device 6 for controlling the above described valve device 5 in accordance with the rotation speed of the engine 7 (hereinafter, also referred to as the engine rotation speed N). The control device 6 includes a computer such as an electronic control device (ECU), which includes a CPU (processor, not depicted) and a memory (storage device) such as ROM and RAM. The CPU operates (e.g. computation of data) in accordance with program instructions loaded to a main storage device, and thereby functional parts required to control the valve device 5 are implemented. Accordingly, it is possible to adjust the proportion of the flow rate of exhaust gas passing through each of the first low-pressure stage introduction passage 93, the second low-pressure stage introduction passage 94, the high-pressure stage bypass passage 95, and the low-pressure stage bypass passage 96, appropriately in accordance with the rotation speed of the engine 7, and to realize an operation mode for the two-stage turbo system 1 as described below.

The operation mode is switched depending on the rotation speed region of the rotation speed of the engine 7, which is one of the following, listed in the ascending order according to the engine rotation speed N: low rotation speed region, middle speed rotation region, and high rotation speed region. Herein, the low rotation speed region is a region where the engine rotation speed is not higher than a first threshold (N≤1), the middle rotation speed region is a region where the engine rotation speed N is from the first threshold to the second threshold which is greater than the first threshold (first threshold<N≤second threshold), and the high rotation speed region is a region where the engine rotation speed N is higher than the second threshold (second threshold<N). In the two-stage turbo system 1, if the engine rotation speed is in the low rotation speed region, turbocharging is performed with two turbochargers: the high-pressure stage turbocharger 2 and the low-pressure stage turbocharger 3 (two stage turbocharging). If the rotation speed of the engine 7 is in the middle rotation speed region, depending on an increase in the rotation speed of the engine 7, the valve device 5 is controlled to perform flow-passage switch and flow-rate adjustment for exhaust gas, and proportion of turbocharging by the high-pressure stage turbocharger 2 is gradually reduced. Further, if the engine rotation speed is in the high rotation speed region, turbocharging is performed with only the low-pressure stage turbocharger 3 (single stage turbocharging). As described above, the two-stage turbo system 1 has an operation principle in which the two-stage turbocharging and the single-stage turbocharging are switched to perform turbocharging in accordance with the rotation speed of the engine 7.

The above operation principle is realized by the control device 6 controlling the valve device 5 in accordance with the rotation speed region of the engine 7. Thus, in the embodiment shown in FIGS. 1 to 7D, an output of a rotation-speed sensor (not shown) capable of detecting the rotation speed of the engine 7 is input into the control device 6, and the rotation speed of the engine 7 (hereinafter, also referred to as the engine rotation speed N) is input. In some other embodiments, an output of a flow-rate sensor (not shown) capable of detecting the flow rate of exhaust gas discharged from the engine 7 may be input to the control device 6, and the rotation speed of the engine 7 (hereinafter, also referred to as the engine rotation speed) may be obtained from a corresponding relationship between the engine rotation speed N and the detection value of the flow-rate sensor (not shown). Further, the operation mode of the two-stage turbo system 1 in the embodiment shown in FIGS. 1 to 7D is as follows.

Figure 6A:
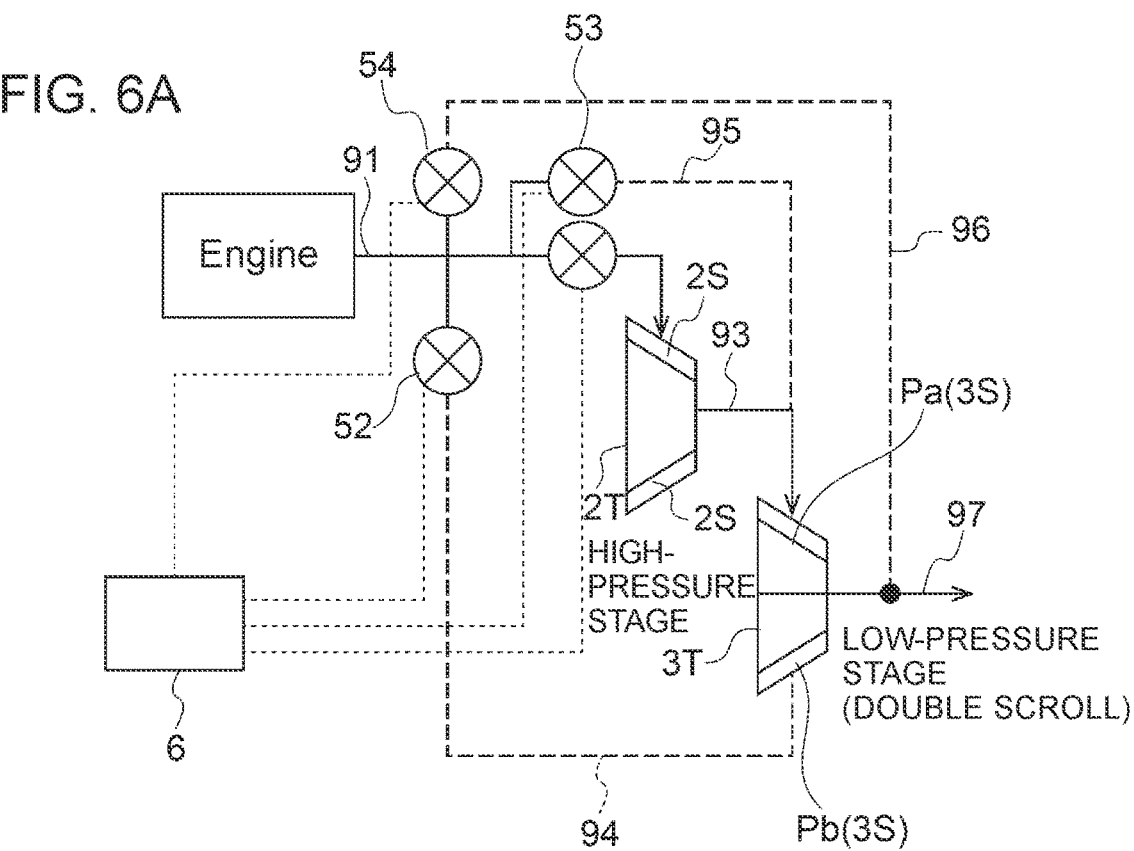
FIG. 6A is a schematic diagram for describing the operation mode of the two-stage turbo system corresponding to FIG. 5A, showing the operation mode in a case where the rotation speed of the engine is in a low rotation speed region.
Figure 6B:
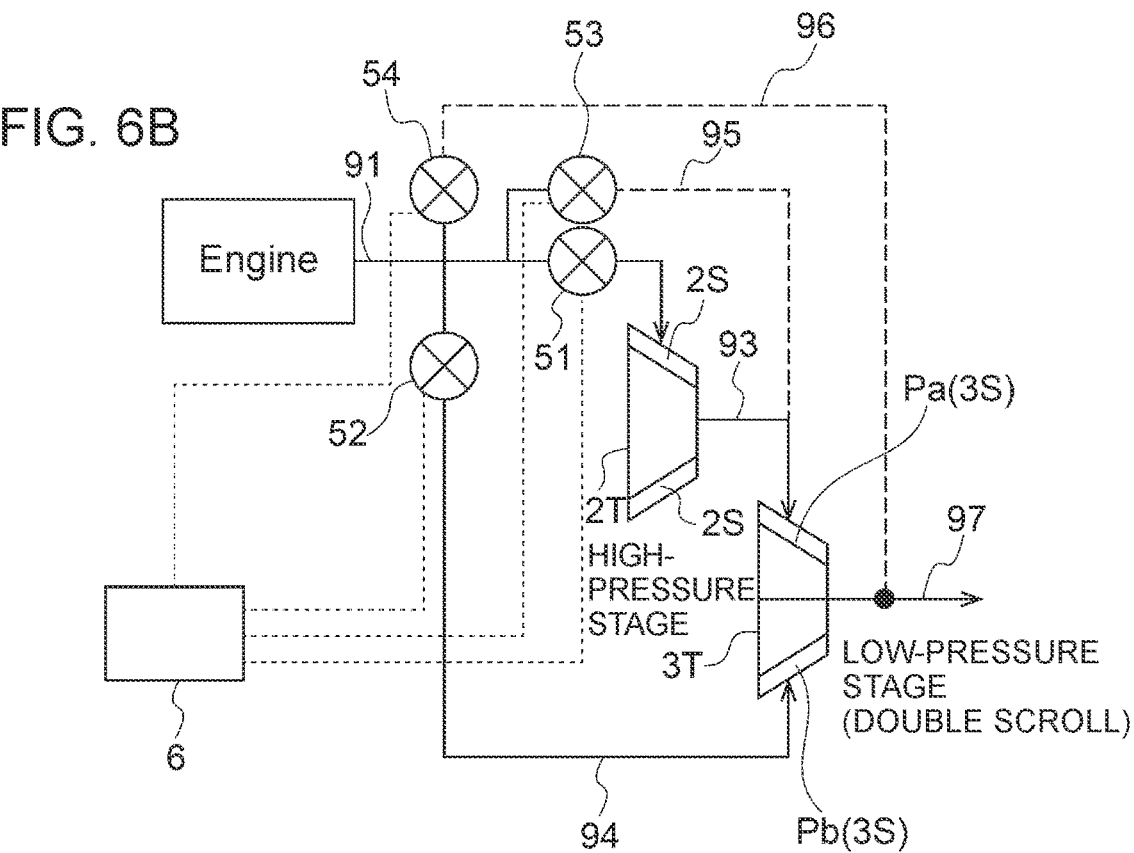
FIG. 6B is a schematic diagram for describing the operation mode of the two-stage turbo system corresponding to FIG. 5A, showing the operation mode in a case where the rotation speed of the engine is in a middle rotation speed region.
Figure 7A:
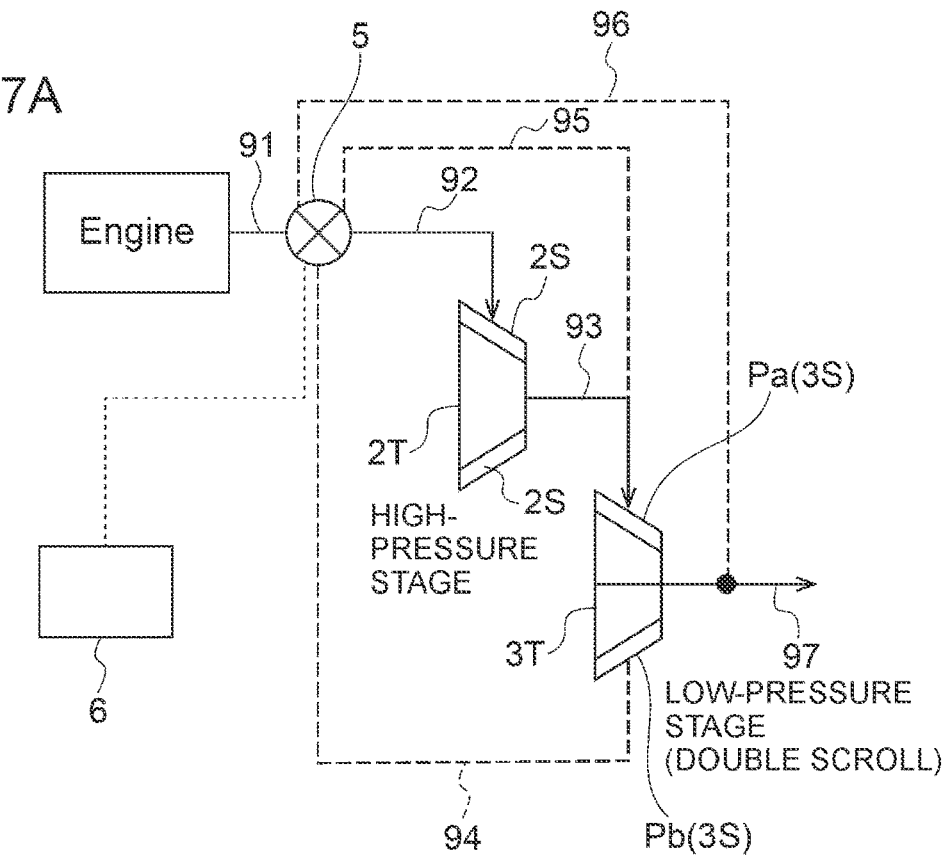
FIG. 7A is a schematic diagram for describing the operation mode of the two-stage turbo system corresponding to FIG. 5B, showing the operation mode in a case where the rotation speed of the engine is in a low rotation speed region.

FIGS. 6A and 7A are each a diagram showing the first operation mode M1 in a case where the engine rotation speed N is in the low rotation speed region (at the low speed time of the engine 7). In this case, as shown in FIGS. 6A and 7A, the control device 6 controls the valve device 5 so as to allow exhaust gas to flow through only the flow passage (above described exhaust gas flow passage I) for supplying exhaust gas discharged from the engine 7 to the first scroll passage Pa of the low-pressure stage turbine 3T, via the high-pressure stage turbine 2T. That is, in the embodiment shown in FIGS. 1 to 7D, as shown in FIGS. 6A and 7A, in the low rotation speed region of the engine 7, the control device 6 controls the valve device 5 so as to allow exhaust gas to pass through the high-pressure stage introduction passage 92, and prevent the exhaust gas from passing each of the second low-pressure stage introduction passage 94, the high-pressure stage bypass passage 95, and the low-pressure stage bypass passage 96. Thus, the exhaust gas is supplied only to the first scroll passage Pa without being supplied to the second scroll passage Pb of the low-pressure stage turbocharger 3. Accordingly, in the low-pressure stage turbocharger 3, it is possible to improve the response of turbocharging while ensuring an appropriate capacity corresponding to the flow rate of exhaust gas in a case where the rotation speed of the engine 7 is in the low rotation speed region.

Figure 7B:
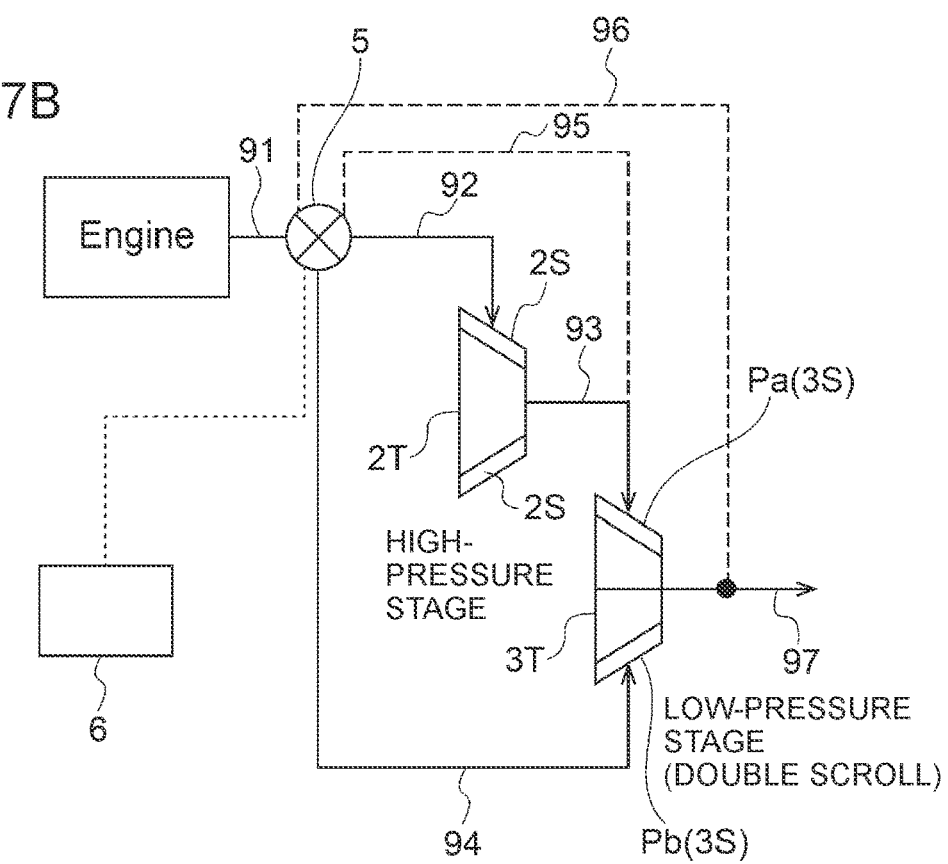
FIG. 7B is a schematic diagram for describing the operation mode of the two-stage turbo system corresponding to FIG. 5B, showing the operation mode in a case where the rotation speed of the engine is in a middle rotation speed region.

FIGS. 6B and 7B are each a diagram showing the second operation mode M2 in a case where the engine rotation speed N is in the middle rotation speed region (at the middle speed time of the engine 7). In this case, as shown in FIGS. 6B and 7B, the control device 6 controls the valve device 5 so as to allow exhaust gas to flow through two flow passages: the flow passage (above described exhaust gas flow passage I) for supplying exhaust gas discharged from the engine 7 to the first scroll passage Pa of the low-pressure stage turbine 3T, via the high-pressure stage turbine 2T; and the flow passage (above described exhaust gas flow passage II) for supplying exhaust gas discharged from the engine 7 to the second scroll passage Pb of the low-pressure stage turbine 3T while bypassing the high-pressure stage turbine 2T. That is, in the embodiment shown in FIGS. 1 to 7D, as shown in FIGS. 6B and 7B, in the middle rotation speed region of the engine 7, the control device 6 controls the valve device 5 so as to allow exhaust gas to pass through each of the high-pressure stage introduction passage 92 and the second low-pressure stage introduction passage 94, and prevent the exhaust gas from passing through each of the high-pressure stage bypass passage 95 and the low-pressure stage bypass passage 96. Thus, the exhaust gas is supplied to both of the first scroll passage Pa and the second scroll passage Pb of the low-pressure stage turbocharger 3. Accordingly, it is possible to improve the response of turbocharging with the high-pressure stage turbocharger 2 and the low-pressure stage turbocharger 3, while ensuring an appropriate capacity corresponding to the flow rate of exhaust gas in the middle rotation speed region.

Figure 7C:
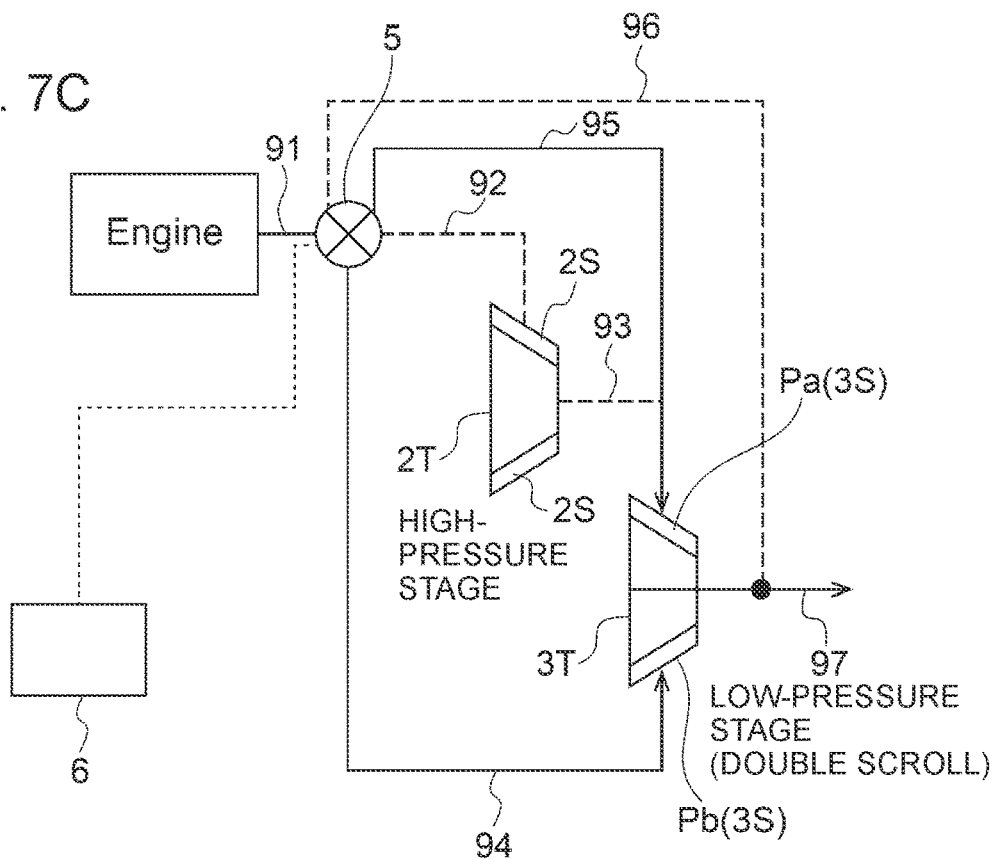
FIG. 7C is a schematic diagram for describing the operation mode of the two-stage turbo system corresponding to FIG. 5B, showing the operation mode in a case where the rotation speed of the engine is in a high rotation speed region.

FIGS. 6C and 7C are each a diagram showing the third operation mode M3 in a case where the engine rotation speed N is in the high rotation speed region (at the high speed time of the engine 7). In this case, as shown in FIGS. 6C and 7C, the control device 6 controls the valve device 5 so as to allow exhaust gas to flow through two flow passages: the flow passage (above described exhaust gas flow passage II) for supplying exhaust gas discharged from the engine 7 to the second scroll passage Pb of the low-pressure stage turbine 3T while bypassing the high-pressure stage turbine 2T; and the flow passage (above described exhaust gas flow passage III) for supplying exhaust gas discharged from the engine 7 to the first scroll passage Pa of the low-pressure stage turbine 3T without passing through the high-pressure stage turbine 2T. That is, in the embodiment shown in FIGS. 1 to 7D, as shown in FIGS. 6C and 7C, in the high rotation speed region of the engine 7, the control device 6 controls the valve device 5 so as to allow exhaust gas to pass through each of the second low-pressure stage introduction passage 94 and the high-pressure stage bypass passage 95, and prevent the exhaust gas from passing through each of the high-pressure stage introduction passage 92 and the low-pressure stage bypass passage 96. Thus, the small-sized high-pressure stage turbine 2T is in an idling state due to stop of exhaust gas supply, and the single stage turbocharging is performed by the large-sized low-pressure stage turbocharger 3. Accordingly, in a case where the rotation speed of the engine 7 is in the high rotation speed region, appropriate turbocharging can be performed in accordance with exhaust gas having a high flow rate with the low-pressure stage turbocharger 3.

Figure 7D:
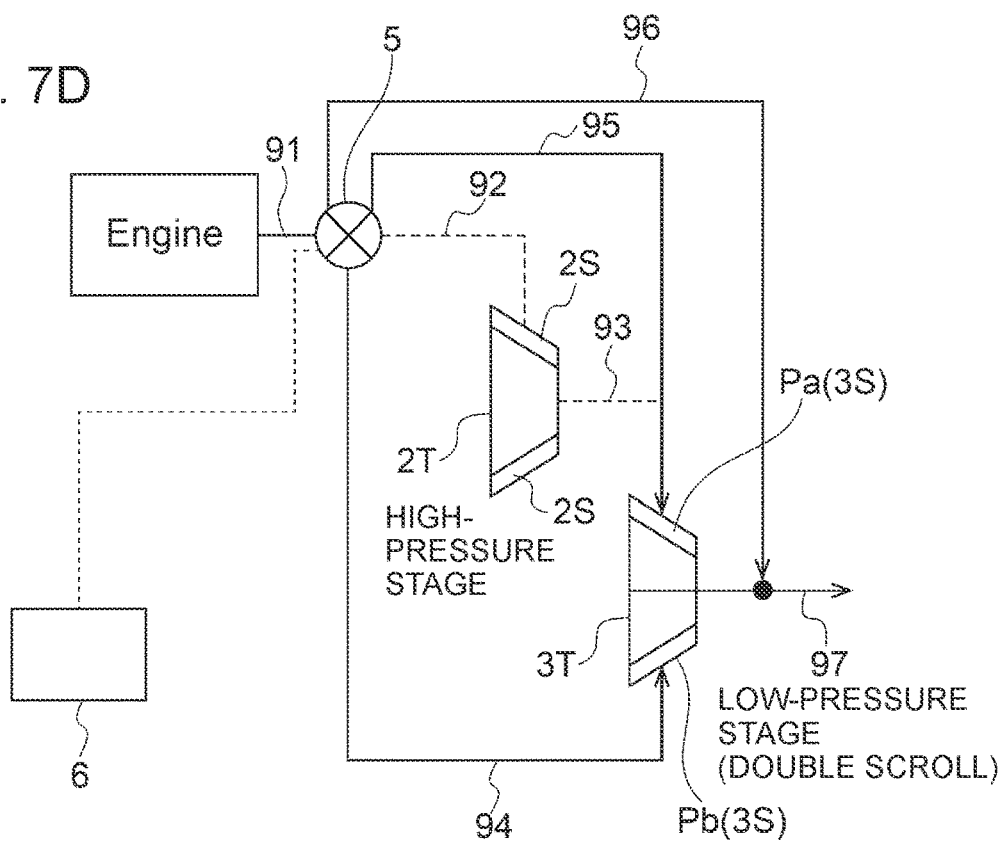
FIG. 7D is a schematic diagram for describing the operation mode of the two-stage turbo system corresponding to FIG. 5B, showing the operation mode in a case where the rotation speed of the engine is at a high rotation speed side within the high rotation speed region.

FIGS. 6D and 7D are each a diagram showing the fourth operation mode M4 in a case where the engine rotation speed N is at a high rotation speed side within the high rotation speed region. In this case, as shown in FIGS. 6D and 7D, the control device 6 controls the valve device 5 so as to allow exhaust gas to flow through three flow passages: the flow passage (above described exhaust gas flow passage II) for supplying exhaust gas discharged from the engine 7 to the second scroll passage Pb of the low-pressure stage turbine 3T while bypassing the high-pressure stage turbine 2T; the flow passage (above described exhaust gas flow passage III) for supplying exhaust gas discharged from the engine 7 to the first scroll passage Pa of the low-pressure stage turbine 3T without passing through the high-pressure stage turbine 2T; and the flow passage (above described exhaust gas flow passage IV) for supplying exhaust gas discharged from the engine 7 to the exhaust passage 9 downstream of the low-pressure stage turbine 3T without passing through either one of the high-pressure stage turbine 2T or the low-pressure stage turbine 3T. That is, in the embodiment shown in FIGS. 1 to 7D, as shown in FIGS. 6D and 7D, at a high rotation speed side of a predetermined rotation speed or higher within the high rotation speed region of the engine 7, the control device 6 controls the valve device 5 so as to allow exhaust gas to pass through each of the second low-pressure stage introduction passage 94, the high-pressure stage bypass passage 95, and the low-pressure stage bypass passage 96, and prevent the exhaust gas from passing through the high-pressure stage introduction passage 92. If the engine rotation speed N is in the high rotation speed region, turbocharging by the high-pressure stage turbocharger 2 is not performed, and the operation mode shifts to this fourth operation mode M4 in case the boost pressure cannot be adjusted by the low-pressure stage turbocharger 3. Accordingly, in a case where the rotation speed of the engine is at a high rotation speed side within the high rotation speed region, it is possible to adjust the boost pressure (pressure downstream of the low-pressure stage compressor 3C) appropriately.

Figure 8:
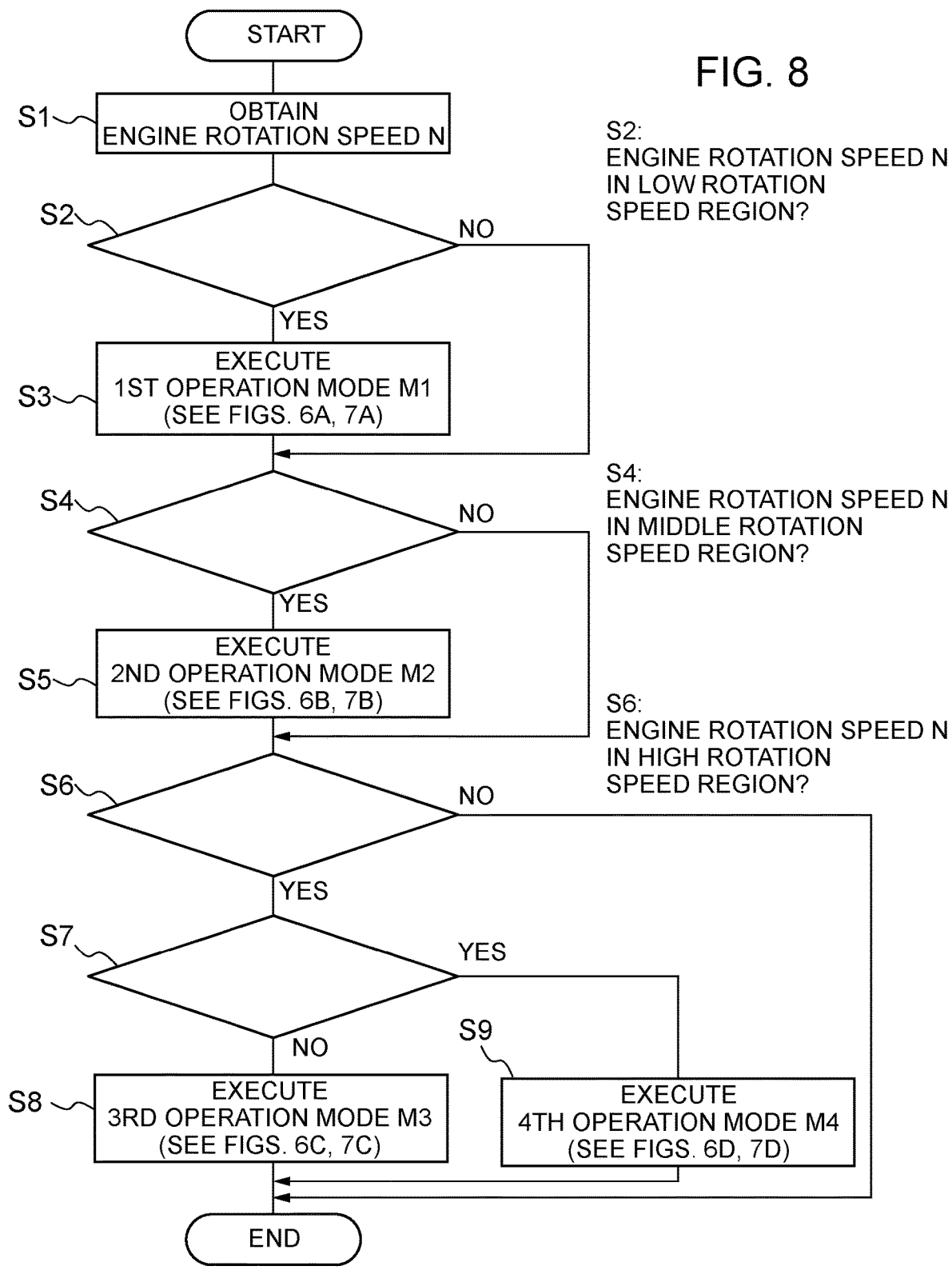
FIG. 8 is a flowchart of a method for controlling the two-stage turbo system according to an embodiment of the present invention.

As described above, the operation mode of the two-stage turbo system 1 is shifted in accordance with the engine rotation speed N. The method for controlling the two-stage turbo system 1 will be described with reference to FIG. 8. FIG. 8 is a flowchart of a method for controlling the two-stage turbo system 1 according to an embodiment of the present invention. The method for controlling the two-stage turbo system 1 includes, as shown in FIG. 8, a rotation speed acquisition step (S1) of obtaining the rotation speed of the engine 7 (S1), a region determination step (S2, S4, S6, S7) of determining the rotation speed region of the rotation speed of the engine 7, and a low rotation speed time control step (S3) that is performed if the rotation speed of the engine 7 is in the low rotation speed region (S3). Further, the present method may further include a middle rotation speed time control step (S5), a first high rotation speed time control step (S8), and a second high rotation speed control step (S9).

Hereinafter, the method for controlling the two-stage turbo system 1 in FIG. 8 will be described, which is performed by the control device 6 controlling the valve device 5 as in the embodiment shown in FIGS. 1 to 7D. Thus, the control device 6 includes functional parts for executing each of the above steps.

In step S1 of FIG. 8, the control device 6 obtains the engine rotation speed N (rotation speed acquisition step). Further, after the step S1, the control device 6 determines the rotation speed region in which the rotation speed of the engine 7 is positioned through comparison, for instance, between the obtained engine rotation speed N and a threshold of the rotation speed (the above described first threshold, second threshold), and performs the above operation modes on the basis of the determination result.

In step S2, the control device 6 determines whether the engine rotation speed N is in the low rotation speed region (region determination step). Then, if the engine rotation speed N is in the low rotation speed region, the control device 6 controls the valve device 5 to execute the first operation mode in step S3 (low rotation speed time control step). That is, in the exhaust passage 9, a flow passage (above described exhaust gas flow passage I) capable of supplying exhaust gas discharged from the engine 7 to the first scroll passage Pa of the low-pressure stage turbine 3T via the high-pressure stage turbine 2T is formed (see FIGS. 6A and 7A). Then, the process advances to the next step S4. Further, the process advances to the next step S4 also if the engine rotation speed N is not in the low rotation speed region in step S2.

In step S4, the control device 6 determines whether the engine rotation speed N is in the middle rotation speed region (region determination step). Then, if the engine rotation speed N is in the middle rotation speed region, the control device 6 controls the valve device 5 to execute the second operation mode M2 in step S5 (middle rotation speed time control step). That is, in the exhaust passage 9, two flow passages, namely, the above described exhaust gas flow passage I, and a flow passage (above described exhaust gas flow passage II) capable of supplying exhaust gas discharged from the engine 7 to the second scroll passage Pb of the low-pressure stage turbine 3T while bypassing the high-pressure stage turbine 2T are formed (see FIGS. 6B and 7B). Then, the process advances to the next step S6. Further, the process advances to the next step S6 also if the engine rotation speed N is not in the middle rotation speed region in step S4.

In step S6, the control device 6 determines whether the engine rotation speed N is in the high rotation speed region (region determination step). Further, if the engine rotation speed N is in the high rotation speed region, in step S7, the control device 6 determines whether the engine rotation speed N is not lower than a predetermined rotation speed (region determination step). If the engine rotation speed N is lower than the predetermined rotation speed in step S7, the control device 6 controls the valve device 5 to execute the third operation mode M3 in step S8 (first high rotation speed time control step). That is, in the exhaust passage 9, two flow passages, namely, the above described exhaust gas flow passage II, and a flow passage (above described exhaust gas flow passage III) capable of supplying exhaust gas discharged from the engine 7 to the first scroll passage Pa of the low-pressure stage turbine 3T without passing through the high-pressure stage turbine 2T are formed (see FIGS. 6C and 7C). Then the flow of FIG. 8 is ended.

In contrast, if the engine rotation speed N is not lower than the predetermined rotation speed in step S7, the control device 6 controls the valve device 5 to execute the fourth operation mode M4 in step S9 (second high rotation speed time control step). That is, in the exhaust passage 9, a flow passage (above described exhaust gas flow passage IV) capable of supplying exhaust gas discharged from the engine 7 to the low-pressure stage downstream passage 97 of the low-pressure stage turbine 3T without passing through either one of the high-pressure stage turbine 2T or the low-pressure stage turbine 3T is added to the flow passages (exhaust gas flow passage II and exhaust gas flow passage III) formed when the engine rotation speed is determined to be in the high rotation speed region, and thereby three flow passages are formed in total (see FIGS. 6D and 7D). Then the flow of FIG. 8 is ended.

In the embodiment shown in FIG. 8, after the execution of steps S3 and S5, the subsequent steps are executed. Nevertheless, this is not limitative, and the flow of FIG. 8 may be ended after performing steps S3 and S5.

Embodiments of the present invention were described in detail above, but the present invention is not limited thereto, and various amendments and modifications may be implemented.

DESCRIPTION OF REFERENCE NUMERALS

1 Two-stage turbo system
2 High-pressure stage turbocharger
2C High-pressure stage compressor
2T High-pressure stage turbine
2m Shaft of high-pressure stage turbocharger
2S Scroll part of high-pressure stage turbocharger
3 Low-pressure stage turbocharger
3C Low-pressure stage compressor
3T Low-pressure stage turbine
3S Scroll part of low-pressure stage turbocharger
3m Shaft of low-pressure stage turbocharger
31 Turbine wheel
31r Wheel housing chamber
32 Inlet of low-pressure stage turbine
33 Outlet of low-pressure stage turbine
34a First tongue
34b Second tongue
Pa First scroll passage
Pb Second scroll passage
5 Valve device
51 First valve
52 Second valve
53 Third valve
54 Fourth valve
6 Control device
7 Engine
8 Intake passage
81 Intake pipe
82 Intake manifold
83 High-pressure stage compressor bypass passage
84 Inter cooler
85 Compressor bypass valve
9 Exhaust passage
91 Exhaust manifold
92 High-pressure stage introduction passage
93 First low-pressure stage introduction passage
94 Second low-pressure stage introduction passage
95 High-pressure stage bypass passage
96 Low-pressure stage bypass passage
97 Low-pressure stage downstream passage
M1 First operation mode (low rotation speed region of engine)
M2 Second operation mode (middle rotation speed region of engine)
M3 Third operation mode (high rotation speed region of engine)
M4 Fourth operation mode (high rotation speed region of engine)
E Nozzle flow passage
Ra First range
Rb Second range
RL Boundary
C Compressor of turbocharger
T Turbine of turbocharger
m Shaft (rotational shaft) of turbocharger
L Rotational axis of low-pressure stage turbine
N Engine rotation speed

The invention claimed is:

1. A two-stage turbo system, comprising:
a high-pressure stage turbocharger having a high-pressure stage turbine disposed in an exhaust passage of an engine; and
a low-pressure stage turbocharger which includes a low-pressure stage turbine disposed downstream of the high-pressure stage turbine in the exhaust passage, and which is larger in size than the high-pressure stage turbocharger,
wherein the low-pressure stage turbine includes at least two scroll passages including a first scroll passage and a second scroll passage, which together form a scroll part for introducing exhaust gas into a nozzle flow passage of the low-pressure stage turbine,
wherein the scroll part is configured such that a first range of the nozzle flow passage into which the exhaust gas passing through the first scroll passage is introduced does not overlap with a second range of the nozzle flow passage into which the exhaust gas passing through the second scroll passage is introduced, in a circumferential direction of the nozzle flow passage,
wherein the exhaust passage includes:
a high-pressure stage introduction passage connecting the engine and an inlet of the high-pressure stage turbine;
a first low-pressure stage introduction passage connecting an outlet of the high-pressure stage turbine and the first scroll passage of the low-pressure stage turbine, and
a second low-pressure stage introduction passage bypassing the high-pressure stage turbine and connecting the engine and the second scroll passage of the low-pressure stage turbine,
wherein the exhaust passage further includes:
a high-pressure stage bypass passage bypassing the high-pressure stage turbine and connecting the engine and the first scroll passage of the low-pressure stage turbine, and
a low-pressure stage bypass passage which bypasses the low-pressure stage turbine into communication, and
wherein the two-stage turbo system further includes a valve device capable of adjusting proportion of a flow rate of the exhaust gas which passes through each of the high-pressure stage introduction passage the second low-pressure stage introduction passage, the high-pressure stage bypass passage, and the low-pressure stage bypass passage.

2. The two stage turbo system according to claim 1, wherein the valve device includes:
- a first valve disposed in the high-pressure stage introduction passage;
- a second valve disposed in the second low-pressure stage introduction passage;
- a third valve disposed in the high-pressure stage bypass passage; and
- a fourth valve disposed in the low-pressure stage bypass passage.

3. The two stage turbo system according to claim 1, wherein the valve device comprises a single valve device capable of adjusting the flow rate of the exhaust gas which passes through each of the high-pressure stage introduction passage, the second low-pressure stage introduction passage, the high-pressure stage bypass passage, and the low-pressure stage bypass passage.

4. The two stage turbo system according to claim 1, further comprising a control device configured to control the valve device according to a rotation speed of the engine.

5. The two stage turbo system according to claim 4, wherein the control device is configured to, if the rotation speed of the engine is in a low rotation speed region, control the valve device so as to allow the exhaust gas to pass through the high-pressure stage introduction passage, and prevent the exhaust gas from passing through each of the second low-pressure stage introduction passage, the high-pressure stage bypass passage, and the low-pressure stage bypass passage.

6. The two stage turbo system according to claim 4, wherein the control device is configured to, if the rotation speed of the engine is in a middle rotation speed region, control the valve device so as to allow the exhaust gas to pass through the high-pressure stage introduction passage and the second low-pressure stage introduction passage, and prevent the exhaust gas from passing through each of the high-pressure stage bypass passage and the low-pressure stage bypass passage.

7. The two stage turbo system according to claim 4, wherein the control device is configured to, if the rotation speed of the engine is in a high rotation speed region, control the valve device to allow the exhaust gas to pass through each of the second low-pressure stage introduction passage and the high-pressure stage bypass passage, and prevent the exhaust gas from passing through each of the high-pressure stage introduction passage and the low-pressure stage bypass passage.

8. The two stage turbo system according to claim 7, wherein the control device is configured to, if the rotation speed of the engine is not lower than a predetermined rotation speed within the high rotation speed region, control the valve device to allow the exhaust gas to pass through each of the second low-pressure stage introduction passage, the high-pressure stage bypass passage, and the low-pressure stage bypass passage, and prevent the exhaust gas from passing through the high-pressure stage introduction passage.

9. A method of controlling the two stage turbo system according to claim 4, which comprises a high-pressure stage turbocharger having a high-pressure stage turbine disposed in an exhaust passage of an engine and a low-pressure stage turbocharger which includes a low-pressure stage turbine disposed downstream of the high-pressure stage turbine in the exhaust passage and which is larger in size than the high-pressure stage turbocharger, the method comprising:
- a rotation speed acquisition step of Obtaining a rotation speed of the engine;
- a region determination step of determining a rotation speed region of the rotation speed of the engine; and
- a low rotation speed time control step of controlling, if the rotation speed of the engine is within a low rotation speed region, a valve device so as to allow exhaust gas to pass through a first scroll passage of the low-pressure stage turbocharger, and prevent the exhaust gas from flowing into a second scroll passage of the low-pressure stage turbocharger.

10. The method of controlling the two-stage turbo system according to claim 9, further comprising a middle rotation speed time control step of controlling, if the rotation speed of the engine is in a middle rotation speed region, the valve device so as to allow the exhaust gas to pass through both of the first scroll passage and the second scroll passage of the low-pressure stage turbocharger.

* * * * *